(12) United States Patent
Kanetaka et al.

(10) Patent No.: US 7,576,927 B2
(45) Date of Patent: Aug. 18, 2009

(54) ZOOM LENS AND ELECTRONIC IMAGING APPARATUS INCORPORATING THE SAME

(75) Inventors: Fumikazu Kanetaka, Shibuya-ku (JP); Toshio Takahashi, Shibuya-ku (JP); Tomoyuki Satori, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 115 days.

(21) Appl. No.: 12/001,262

(22) Filed: Dec. 7, 2007

(65) Prior Publication Data

US 2008/0170300 A1     Jul. 17, 2008

(30) Foreign Application Priority Data

Dec. 8, 2006  (JP) .............. 2006-331772

(51) Int. Cl.
    *G02B 9/34*    (2006.01)
(52) U.S. Cl. .................. 359/774; 359/687; 359/758
(58) Field of Classification Search .................. 359/676, 359/687, 758, 774
    See application file for complete search history.

(56) References Cited

U.S. PATENT DOCUMENTS 7,190,529 B2 * 3/2007 Miyajima et al. ........... 359/687

FOREIGN PATENT DOCUMENTS

| JP | 2002-31756 | 1/2002 |
|---|---|---|
| JP | 2003-98433 | 4/2003 |
| JP | 2004-199000 | 7/2004 |

* cited by examiner

*Primary Examiner*—Joseph Martinez
(74) *Attorney, Agent, or Firm*—Kenyon & Kenyon LLP

(57) ABSTRACT

The invention relates to a less costly zoom lens that can offer a sensible tradeoff between size reductions and high zoom ratios with a well-kept image quality, and that lends itself to an electronic imaging device such as a CCD or CMOS. The zoom lens comprises a positive first lens group G1, a negative second lens group G2, a positive third lens group G3 and a positive fourth lens group G4, wherein zooming is implemented by changing the space between adjacent lens groups. The first lens group G1 comprises one positive lens, the second lens group G2 comprises two lenses, and the fourth lens group G4 comprises one positive lens. The zoom lens satisfies condition (1) needed for making sure an ideal situation for the zoom ratio and low costs and condition (2) needed for the first lens group to comprise a minimum one lens and to hold back chromatic aberration of magnification as much as possible.

13 Claims, 23 Drawing Sheets

ZOOM LENS AND ELECTRONIC IMAGING APPARATUS INCORPORATING THE SAME

This application claims benefit of Japanese Application No. 2006-331772 filed in Japan on Dec. 8, 2006, the contents of which are incorporated by this reference.

BACKGROUND OF THE INVENTION

The present invention relates generally to a zoom lens and an electronic imaging apparatus using the same, and more particularly to an electronic imaging apparatus whose size is reduced, inclusive of a video camera or digital camera.

In recent years, electronic imaging apparatus (for instance, digital cameras) designed to take images of subjects using solid-state imaging devices such as CCDs or CMOSs in place of silver-halide film cameras have became mainstream. Further, they have now a wide spectrum of categories from the commercial high-end type to the compact low-end type. The invention takes aim at the compact low-end type in particular.

Users of such low-end type digital cameras would enjoy snapping shots over a wide range of scenes at any time in any place. For this reason, preference is now given to small-format digital cameras, especially ones of the type that can be well put away in the pockets of clothing or baggage, is convenient to carry around, and is slimmed down in their thickness direction. On the other hand, the compact type digital cameras have had generally a zoom ratio of the order of 3. Now, however, there is a growing demand for digital cameras having a zoom ratio higher than ever before to let them find use over a wider range of scenes.

The primary object of the invention is to achieve a zoom lens that is designed to make it easy to slim down an associated electronic imaging apparatus and have a zoom ratio of as high as about 5. As a matter of course, a particular object of the invention is to provide a less costly zoom lens that can take images with good image quality and lends itself to an electronic imaging device such as a CCD or CMOS.

Among prior compact zoom lenses having relatively high zoom ratios, there is a particular type comprising, in order from its object side, a positive first lens group, a negative second lens group, a positive third lens group and a positive fourth lens group, as already set forth in:

[Patent Publication 1]
JP(A)2002-31756, esp., Examples 1, 2, 3
[Patent Publication 2]
JP(A)2003-98433, esp., Examples 2, 3
[Patent Publication 3]
JP(A)2004-199000, esp., Examples 5, 6, 7

Of the sizes of a digital camera, the thickness direction size is primarily determined by a lens barrel; to slim down the digital camera, it is impeccable to slim down the lens barrel including a zoom lens. Consequently, of vital importance is the arrangement of a zoom lens optical system with the slimming-down of the lens barrel in mind. In more recent years, general use has been made of the so-called collapsible mount type where, when the digital camera is in use, the lens barrel is unfolded from within the digital cameral body, and when it is not in use, the lens barrel is folded down in the digital camera body. It is thus important that the zoom lens is set up while the slimming-down of the lens barrel upon folded down in the body is factored in.

Specifically, to slim down the lens barrel when it is folded down in the camera body, it is imperative to use zoom lens groups with a reduced number of lenses or curtail the total length of the zoom lens.

There is now also a mounting demand for the so-called low-cost digital cameras that allow for casual snapping and, at the same time, may be purchased offhand. Thus, there is an increasing demand for zoom lenses that satisfy slimming down and lower costs at the same time.

Such cost reductions may be achievable by the use of easily available vitreous materials; however, decreases in the number of vitreous material forming a zoom lens would be more easily achievable. A reduced lens parts count is vitally significant for cost, because not only can the vitreous material cost itself be cut down but also assembling can be much more facilitated.

However, there is no point in giving too much to cost reductions at the cost of the ability to flatter important for the camera's own performance as well as the "handy high-zoom-ratio zoom lens" that is most desirable for users. There is thus a mounting demand for a zoom lens that cuts down cost while making sure these specifications.

With the prior arts as mentioned above, the second lens group in particular that is especially of larger size in the thickness direction is designed such that its thickness direction size is reduced by allowing it to be made up of two lenses, a negative and a positive. At the second lens group, off-axis rays gain height from on the optical axis; when it is intended to make sure the necessary edge thickness of the lenses, their edges tend to grow very thick. Further, as the second lens group is made up of a lot more lenses, the entrance pupil position becomes far away from the object side in appearance, and so off-axis rays passing through the second lens group get much higher, resulting in the need of increasing the axial edge thickness to make sure the edge thickness. As a matter of course, a lot more lenses result in an increase in the axial thickness. Accordingly, as the lenses increase in number, it causes the diametrical size and axial thickness of this lens group to grow larger than necessary; even when they are stowed away in the lens mount, any sufficient compactness of the lens barrel is not achievable. Thus, composing the second lens group of as small as two lenses is preferable for the purpose of making the lens barrel compact.

In some prior arts, the total number of lenses in the zoom lens is reduced down to about 8 or 9, and that number could possibly provide a less costly zoom lens.

However, the prior arts as mentioned above have the following problems.

In the examples of Patent Publication 1, the number of lenses in the zoom lens is limited to up to 9: that number could possibly achieve cost reductions and a decrease in the total lens thickness.

However, that prior art has a zoom ratio of as low as about 3, a figure that would not well meet users' demands. All other prior arts, too, have a zoom ratio of about 3, a figure that would not be sufficient in view of specifications, although they may achieve cost reductions with fewer lenses.

Such problems as described above are caused for the following reasons.

Generally speaking, a zoom lens comprising a positive first lens group, a negative second lens group, a positive third lens group and a positive fourth lens group, the first and second lens groups have often some considerable role in the correction of optical performance in general, and chromatic aberration of magnification in particular. To minimize aberration fluctuations at these lens groups and make sure good enough optical performance, it is thus required that aberrations occurring in the first and second lens groups be as much reduced as possible.

To make good enough correction of chromatic aberrations, it is preferable to use a lot more lenses, but as the number of lenses increases, it does not only cause cost rises but also incurs an increase in the size of the whole zoom lens, because of the need of meeting fabrication requirements such as the optical axis thickness, the peripheral edge of each lens and the optical axis thickness of each lens.

In the prior arts as mentioned above, the first lens group is made up of one lens and the second lens group is made up of two lenses with this in mind. For this reason, however, there is no good enough optical performance ensured with the result that the zoom ratio still stays at about 3.

SUMMARY OF THE INVENTION

In view of such problems with the prior art as described above, the invention has for its object the provision of a lest costly zoom lens that offers a sensible tradeoff between the size reductions of an electronic imaging apparatus and a high-zoom-ratio arrangement so as to meet user's demands for making sure wider scenes than ever before without detrimental to the ability of electronic imaging apparatus to carry around, and is fit for electronic imaging devices such as CCDs or CMOSs with the image quality of taken images kept good.

According to the invention, the aforesaid object is accomplishable by the provision of a zoom lens, characterized by comprising, in order from its object side, a positive first lens group, a negative second lens group, a positive third lens group and a positive fourth lens group, wherein zooming is implemented by changing the space between adjacent lens groups, said first lens group comprises one positive lens, said second lens group comprises two lenses, and said fourth lens group comprises one positive lens, with satisfaction of the following conditions:

$$4<Z<8 \qquad (1)$$

$$80<v_d<98 \qquad (2)$$

where Z is the zoom ratio, and $v_d$ is the Abbe constant of the first lens forming the first lens group.

The advantages of, and the requirements for, such arrangement are now explained.

To achieve a zoom ratio of about 5, the invention relies upon a zooming arrangement comprising, in order from its object side, a positive first lens group, a negative second lens group, a positive third lens group and a positive fourth lens group wherein zooming is implemented by changing the space between adjacent groups. Such arrangement enables the respective groups to have an efficient zoom sharing thereby minimizing aberration fluctuations upon zooming and, at the same time, staving off any increase in the amount of movement of each group. All of this contributes to making the optical system compact.

To achieve low costs and compactness through this arrangement, the first lens group comprises one lens and the second lens group comprises two lenses: insofar as the power profile is concerned, this is the best balanced arrangement comprising a minimum necessary number of lenses.

First, condition (1) is explained. Condition (1) is the requirement for making sure an ideal situation for the zoom ratio and low costs demanded by the user. As the upper limit of 8 to condition (1) is exceeded, it permits the zoom ratio demanded by the user to be satisfied, but there is an added cost resulting from a lot more lenses used to achieve the desired optical performance, eventually making it difficult to provide digital cameras at the price demanded by the user. As the lower limit of 4 to condition (1) is not reached, it permits a zoom lens to be easily set up and provided at low prices, but it renders it hard to achieve performance satisfactory to the user all over the zoom range or high zoom ratios. As a result, lens specifications satisfactory to the user will hardly be obtained.

Next, condition (2) is explained. The use of the minimum necessary number of lenses may make the camera thinner in the depth direction upon received at a lens mount. In consideration of optical performance, however, it is efficient to give weight on the glass dispersion of the first lens that forms the first lens group. In this lens power profile, chromatic aberrations occurring at the first lens group will be enlarged through the second and subsequent lens groups. It is thus important that the first lens group comprises a minimum one lens, and that the vitreous material satisfying condition (2) is used to reduce as much chromatic aberration of magnification as possible. As the lower limit of 80 to condition (2) is not reached, chromatic aberration of magnification produced at the first lens group grows large, rendering it difficult to make sure optical performance. More exactly, there is much difficulty in holding back fluctuations of the chromatic aberration of magnification all over the zoom range from the wide-angle side to the telephoto side: it is difficult to make sure stable optical performance all over the zoom range. As the upper limit of 98 to condition (2) is exceeded, there are only special vitreous materials leading to an added cost. As a result, it is rather difficult to accomplish the invention's own object of providing a less costly zoom lens.

To achieve a further prevention of chromatic aberrations as mentioned above, it is more efficient to satisfy the following condition:

$$90<v_d<98 \qquad (9)$$

Condition (9) narrows the lower limit value of condition (2) down to 90, and as the Abbe constant of the first lens grows larger, it goes without saying that there is a further lessening of design load, because the occurrence of chromatic aberrations is much more reduced for the aforesaid reason.

To accomplish the object of the invention, it is more efficient to satisfy the following condition in addition to the aforesaid requirements:

$$1.2<DT/f_t<2.0 \qquad (3)$$

where DT is the distance along the optical axis of the object-side lens apex of the first lens to an imaging position at the telephoto end of the optical system, and $f_t$ is the focal length of the whole system.

With the power profile of the lens system adopted here wherein the first lens group is positive, the second lens group is negative, the third lens group is positive and the fourth lens group is positive so that they have an efficient zoom sharing, the lens system has the nature of growing longest at the telephoto end.

That the total length grows long at the telephoto end means the need of extending the first lens group longer in operation than received at a lens mount; however, this leads to an increase in the length per ring of the lens barrel for stowing away the respective lens groups of a digital camera. That is, when a lens system whose total length at the telephoto end stays long is constructed of a lens barrel having a reduced number of rings, there is the need of using a lens barrel whose length per ring grows long, and the length of the camera upon received at the lens mount is determined by the length of the lens barrel per ring with the result that the zoom lens grows thick. As a lot more rings are used to slim down the zoom lens, it permits the length of the lens barrel per ring to be reduced, but a lot more parts are needed, resulting in an added cost.

Condition (3) is primarily about the whole size of the zoom lens system and the focal length of the zoom lens system achievable at the telephoto end. As the upper limit of 2.0 to condition (3) is exceeded, it means that the size of the lens system is increased relative to the focal length or that optical performance is easily achievable, but it leads directly to an increase in the total length of the zoom lens, resulting in an increase in the thickness of a digital camera for the aforesaid reason. As the lower limit of 1.2 is not reached, it is difficult to make sure performance at the telephoto end in an effort to make sure performance at such a high zoom ratio as defined by condition (1). More exactly, when it is intended to slim down a digital camera while such a zoom ratio is gained, the position of the entrance pupil with respect to the lens entrance surface must somehow be not that much close to the imaging side. In other words, the position of the entrance pupil must be designed lie more on the object side than the best position for the power profile. For this reason, there is a field tilt of the lens system occurring. As the lower limit to condition (3) is not reached, it is difficult to make correction of that field tilt and, hence, make sure performance at the telephoto end.

To accomplish the object of the invention, it is more efficient to satisfy the following condition in addition to the aforesaid requirements:

$$0.5 < f_1/f_t < 1.50 \quad (4)$$

where $f_1$ is the focal length of the first lens group, and $f_t$ is the focal length of the whole system at the telephoto end.

The aforesaid condition is provided to define the power of the first lens group in the zoom lens of the invention. In the lens power profile adopted here, the first lens group is constructed of a minimum one lens thereby slimming down the lens system. In this case, various aberrations with chromatic aberration of magnification as center must be held back as much as possible at the first lens group; insofar as the setup of the single lens is concerned, however, chromatic aberration of magnification in particular can never in principle be reduced down to zero at the first lens group alone. Condition (4) is the requirement for defining the power of the first lens group that is limited by the degree of aberrations remaining at the first lens group.

As the lower limit of 0.5 to condition (4) is not reached, it causes the power of the first lens group to grow too strong to correct various aberrations typified by chromatic aberration of magnification. As the upper limit of 1.50 to condition (4) is exceeded, it causes the power of the first lens group to become too weak and so may render correction of aberrations easier; however, the first lens group makes a less contribution to zooming, resulting in an increase in the size of the lens system.

To accomplish the object of the invention, it is more efficient to satisfy the following condition in addition to the aforesaid requirements:

$$-0.40 < f_2/f_t < -0.1 \quad (5)$$

where $f_2$ is the focal length of the second lens group, and $f_t$ is the focal length of the whole system at the telephoto end.

The aforesaid condition defines the power of the second lens group in the zoom lens of the invention. The objective of the power profile adopted here is to slim down the lens system and reduce the cost involved by setting up the second lens group with two lenses. A lot more lenses, of course, will make correction of aberrations easier, but they will add up an extra cost. In addition, the lens group itself will thicken due to the need of making sure the edge and middle thicknesses of each lens on processing or the like. If the second lens group is set up with one lens, on the contrary, there will be a lesser degree of flexibility in correction of aberrations and correction of chromatic aberrations in particular will become difficult. For the aforesaid reason, the second lens group should be made up of two lenses in the invention.

In this state, of course, there is the optimum value for the power of the second lens group, too. As the lower limit of −0.4 to condition (5) is not reached, it causes the power of the second lens group to become small, going in favor of correction of aberrations. For an arrangement having high zoom capabilities as contemplated here, however, the second lens group must move a considerable amount upon zooming. Consequently, the space between the second and the third lens group at the wide-angle end tends to grow wide, winding up an increase in the height of rays through the second lens group. This in turn leads directly to an increase in the height of rays through the first lens group. Because, as already noted, the first lens group is made up of one lens, there is a lesser degree of flexibility in correction of chromatic aberrations. An increased ray height can keep aberrations going on at the first lens group, rendering correction of chromatic aberrations in particular very difficult. As the upper limit of −0.1 to condition (5) is exceeded, it rather causes the power of the second lens group to grow too strong to place aberrations such as astigmatism and coma in a well-balanced state.

To accomplish the object of the invention, it is more efficient to satisfy the following condition in addition to the aforesaid requirements:

$$-0.5 < SF_1 < -0.03 \quad (6)$$

where $SF_1$ is defined as $SF_1 = (R_{1f} + R_{1r})/(R_{1f} - R_{1r})$ wherein $R_{1f}$ is the radius of curvature of the object-side surface of the first lens, and $R_{1r}$ is the radius of curvature of the image-side surface of the first lens.

The aforesaid condition defines the lens shape of the first lens group herein made up of one lens. At the first lens group because of being made up of one lens, it is basically and in principle impossible to reduce chromatic aberrations down to just zero. As noted above, the first lens group lies near one end in appearance, rim rays tend to gain height at the wide-angle end, likely to have influences on the so-called off-axis aberrations like astigmatism, coma and distortion. Further, a marginal ray at the center of the first lens group, too, gains height in its own way; the shape of the first lens is also important for the center performance of the lens system at the telephoto end.

As the first lens group exceeds the upper limit of −0.03 to condition (6), it renders correction of spherical aberrations difficult at the telephoto end, and renders it difficult to make sure performance all over the zoom range as well. As the first lens group runs short to the lower limit of −0.5 to condition (6), it renders correction of distortion at the wide-angle end difficult: it renders it difficult to make sure performance all over the zoom range.

To accomplish the object of the invention, it is more efficient to satisfy the following condition in addition to the aforesaid requirements:

$$0 < SF_2 < 0.6 \quad (7)$$

where $SF_2$ is defined as $SF_2 = (R_{2f} + R_{2r})/(R_{2f} - R_{2r})$ wherein:

$R_{2f}$ is the radius of curvature of the object-side surface of the object-side lens in the second lens group, and $R_{2r}$ is the radius of curvature of the image-side surface of the object-side lens in the second lens group.

The aforesaid condition defines the shape of the lens located in, and nearest to the object side of, the second lens group. When the arrangement of the invention is adopted, there are rim rays gaining height at the lens located in, and nearest to the object side of, the second lens group. Accordingly, the shape of the lens located in, and nearest to the object side of, the second lens group plays an important role in correction of off-axis aberrations in particular. As that lens departs from the upper limit of 0.6 and the lower limit of 0 to condition (7), it renders it difficult to make a well-balanced adjustment and correction of off-axis various aberrations on the wide-angle side, especially field curvature. More specifically, there will be a field tilt occurring although distortion is in good condition, and it will be impossible to make sure performance all over the zoom range due to considerable fluctuations of the image plane from the wide-angle side to the telephoto side.

More specifically, as that lens exceeds the upper limit to condition (7), the curvature of its image-side surface grows too large, and off-axis aberrations such as distortion and field curvature at the wide-angle end in particular grow large. At less than the lower limit, the curvature of its object-side surface grows again large: various off-axis aberrations produced at the wide-angle end become excessive.

To accomplish the object of the invention, it is more efficient to satisfy the following condition in addition to the aforesaid requirements:

$$1.5 < R(G_{1r})/R(G_{2f}) < 2.4 \quad (8)$$

where $R(G_{1r})$ is the radius of curvature of the surface located in, and nearest to the image side of, the first lens group, and $R(G_{2f})$ is the radius of curvature of the surface located in, and nearest to the object side of, the second lens group.

Condition (8) defines the shape of an air lens that is sandwiched in the aforesaid power profile between the first lens group and the second lens group mainly at the wide-angle end. With the lens type having the aforesaid power profile of +−++, the degree of contribution of distortion at the wide-angle end tends to reach a maximum at an air lens portion sandwiched between the first lens group and the second lens group. This results from a structure where rim rays at the wide-angle end before and after that air lens portion are largely refracted, and it is generally said that the smaller the distortion, the better the imaging capability of the lens.

Most of recent digital cameras are capable of making an electrical correction of distortion. However, such a processing mechanism leads to an added cost, and so if possible, it is preferable to improve on lens performance without recourse to any electrical processing mechanism. Further, when aim is taken at size and cost reductions as in the object of the invention, the electrical processing mechanism for distortion costs more relative to lens prices, and works much against the eventual cost. Condition (8) is the requirement for inhibiting the occurrence of distortion bringing about such inconvenience. As the upper limit of 2.4 is exceeded, it causes distortion produced at the wide-angle end to remain under-corrected, ending up with the provision of a lens for which the electrical processing mechanism is needed for distortion. As the lower limit of 1.5 is not reached, distortion is easily held back but, instead, other aberrations leading directly to peripheral performance such as field curvature and coma occur more with the result that the ensuing lens becomes poor in performance.

Further, to accomplish this objective, it is more efficient to configure the surface located in, and nearest to the image side of, the first lens group as an aspheric surface. The image-side surface in the first lens group is one of the surfaces through which rim rays are most refracted at the wide-angle end; if that surface is configured as an aspheric surface at which the angle of refraction of rim rays does not grow that much, it is then possible to hold back the occurrence of distortion in a more efficiency manner.

In the invention, the fourth lens group is made up of a single lens, because it is possible to make sure performance with one lens when the aberration role of the fourth lens group is factored in. In this case, it is only as a matter of course that the fourth lens group is made up of a minimum one lens in consideration of size reductions and cost reductions. To allow the fourth lens group to be made up of one lens, optical aberrations have to be well held back at the first lens group and the second lens group: it goes without saying that the more the aforesaid conditions are satisfied, the easier the design becomes.

The invention also provides a zoom lens, characterized by comprising, in order from its object side, a positive first lens group, a negative second lens group, a positive third lens group and a positive fourth lens group, wherein zooming is implemented by changing the space between adjacent lens groups, and wherein the first lens group comprises one positive lens, the second lens group comprises two lenses, and the fourth lens group comprises one positive lens, with satisfaction of the following condition:

$$0.4 < D_2/f_w < 0.7 \quad (A), or$$

$$0.08 < D_2/f_t < 0.22 \quad (B)$$

where $D_2$ is a distance as measured along the optical axis from the apex of the lens located in, and nearest to the object side of, the second lens group to the apex of the lens located in, and nearest to the image side of, the second lens group, $f_w$ is the focal length of the whole system at the wide-angle end, and $f_t$ is the focal length of the whole system at the telephoto end.

These requirements are now explained.

First of all, the power profile of the lens arrangement and the number of lenses in the respective lens groups are the same as described above. To add up this, the requirements given by conditions (A) and (B) should be satisfied.

Conditions (A) and (B) are the requirements for defining the practical thickness of the second lens group. That thickness may be determined on the basis of the focal length of the whole system at either the wide-angle end or the telephoto end: the conditions may be selectively used depending on the respective zoom ratios. For size reductions, it is preferable to satisfy both conditions (A) and (B) at the same time. Because complicated factors having something to do with cost are involved in size reductions, however, when exclusive aim is taken at size reductions resulting possibly in cost rises, it is desirous to meet either one of those conditions.

Generally when a lens system is reduced in size and thickness, the size and thickness of each lens group are going to be reduced. When aim is taken at size reductions in the lens profile of the invention, however, the thickness of the second lens group becomes one of the most imperative factors. Exceeding the upper limit of 0.7 to condition (A) may facilitate correction of aberrations, but the second lens group grows too thick along the optical axis, resulting in the inability to reduce the whole camera size. Running short of the lower limit of 0.4 to condition (A) renders it difficult to make sure the edge thickness of a positive lens and the middle thickness of a negative lens are processed, working against lens fabrication.

Further, the invention provides a zoom lens, characterized by comprising, in order from its object side, a positive first lens group, a negative second lens group, a positive third lens group and a positive fourth lens group, wherein zooming is implemented by changing the space between adjacent lens groups, and wherein the first lens group comprises one positive lens, the second lens group comprises two lenses, and the fourth lens group comprises one positive lens, with satisfaction of the following condition:

$$0.4 < D_3/f_w < 0.7 \quad \text{(C), or}$$

$$0.1 < D_3/f_t < 0.22 \quad \text{(D)}$$

where $D_3$ is a distance as measured along the optical axis from the apex of the lens located in, and nearest to the object side of, the third lens group to the apex of the lens located in, and nearest to the image side of, the third lens group, $f_w$ is the focal length of the whole system at the wide-angle end, and $f_t$ is the focal length of the whole system at the telephoto end.

These requirements are now explained.

First of all, the power profile of the lens arrangement and the number of lenses in the respective lens group are the same as described above. To add up this, the requirements given by conditions (C) and (D) should be satisfied.

Conditions (C) and (D) are the requirements for defining the practical thickness of the third lens group. That thickness may be determined on the basis of the focal length of the whole system at either the wide-angle end or the telephoto end: the conditions may be selectively used depending on the respective zoom ratios. For size reductions, it is preferable to satisfy both conditions (C) and (D) at the same time. Because complicated factors having something to do with cost are involved in size reductions, however, when exclusive aim is taken at size reductions resulting possibly in cost rises, it is desirous to meet either one of those conditions.

Generally when a lens system is reduced in size and thickness, the size and thickness of each lens group are going to be reduced. When aim is taken at size reductions in the lens profile of the invention, however, the thickness of the third lens group becomes one of the most imperative factors. Exceeding the upper limit of 0.7 to condition (C) may facilitate correction of aberrations, but the third lens group grows too thick along the optical axis, resulting in the inability to reduce the whole camera size. Running short of the lower limit of 0.4 to condition (C) renders it difficult to make sure the edge thickness of a positive lens and the middle thickness of a negative lens are processed, working against lens fabrication.

If the upper limits to conditions (B) and (D) are set at 0.18, it is then possible to more efficiently reduce the size of the inventive zoom lens.

As can be appreciated from what has been described, the present invention makes it possible to provide a less costly zoom lens that, without detrimental to the ability of an associated camera to carry around, satisfies both the size reductions and the high zoom ratio of the camera in such a way as to meet users' demands for taking photographs in a wider range of scenes than ever before; specifically that is suitable for slimming down an associated lens barrel upon put away in a lens mount, makes sure a zoom ratio of as high as about 5, maintain good photographic image quality, and lends itself to an electronic imaging device such as a CCD or CMOS, as well as an electronic imaging apparatus incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The zoom lens of the invention is now explained with reference to Examples 1 to 10. FIGS. 1 to 10 are illustrative in lens arrangement section of Examples 1 to 10 at the wide-angle ends (a), in the intermediate states (b) and at the telephoto ends (c) upon focusing on an object point at infinity. Throughout FIGS. 1 to 10, G1 stands for the first lens group; G2 the second lens group; S an aperture stop; G3 the third lens group; G4 the fourth lens group; F a plane-parallel plate that forms a low-pass filter with an IR cut coating applied on it, etc.; C a plane-parallel plate for the cover glass of an electronic imaging apparatus (CCD); and I an image plane of the CCD. Note here that for a near infrared sharp cut coating, for instance, it may be coated directly on an optical low-pass filter F or, alternatively, there may be another infrared cut absorption filter located.

EXAMPLE 1

Figure 1A:
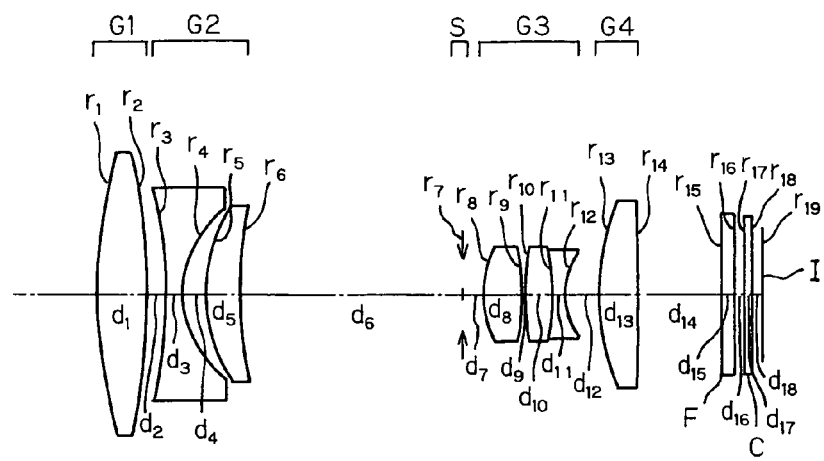
FIG. 1 is illustrative in lens arrangement section of Example 1 of the inventive zoom lens at the wide-angle end (a), in the intermediate state (b) and at the telephoto end (c) upon focusing on an object point at infinity.
Figure 1B:
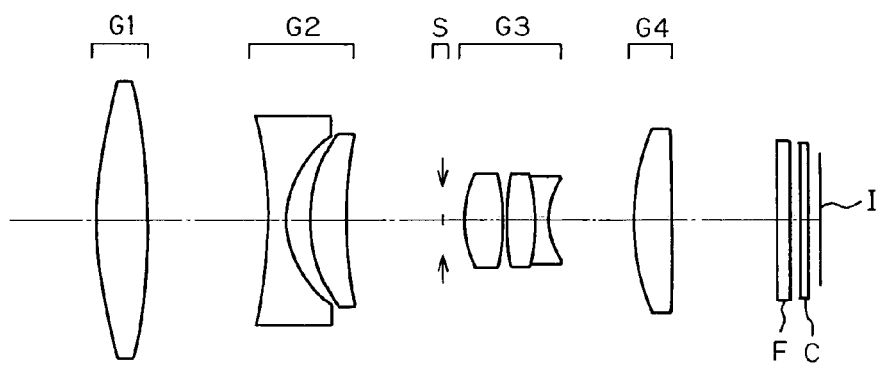
Figure 1C:
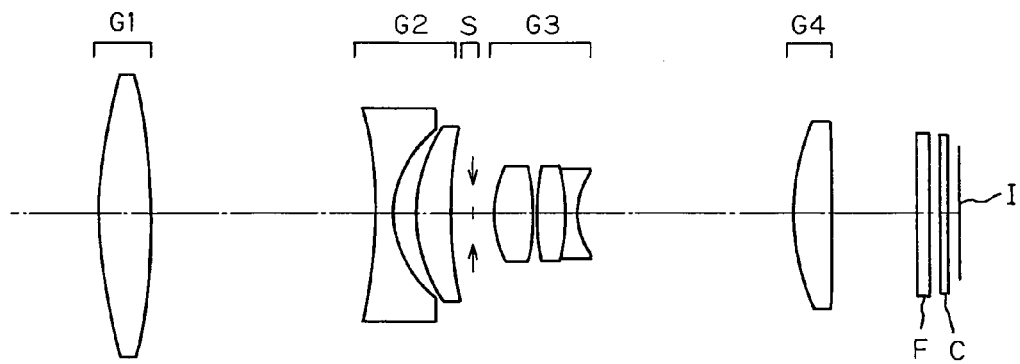

As shown in FIG. 1, Example 1 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves in a convex locus toward the object side while the space between it and the third lens group G3 grows wide and is positioned more on the object side at the telephoto end than at the wide-angle end, and is positioned more on the object side at the telephoto end than at the wide-angle end.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a double-convex positive lens and a double-concave negative lens; and the fourth lens group G4 is made up of one double-convex positive lens.

Six aspheric surfaces are used: two at both surfaces of the double-convex positive lens in the first lens group G1, two at both surfaces of the double-concave negative lens in the second lens group G2, and two at both surfaces of the double-convex positive lens that is the single lens in the third lens group G3.

EXAMPLE 2

Figure 2A:
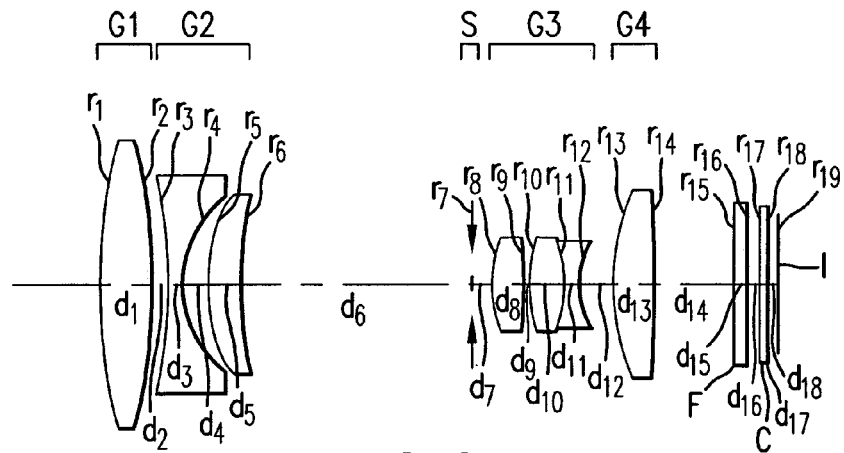
FIG. 2 is illustrative, as in FIG. 1, of Example 2 of the inventive zoom lens.
Figure 2B:
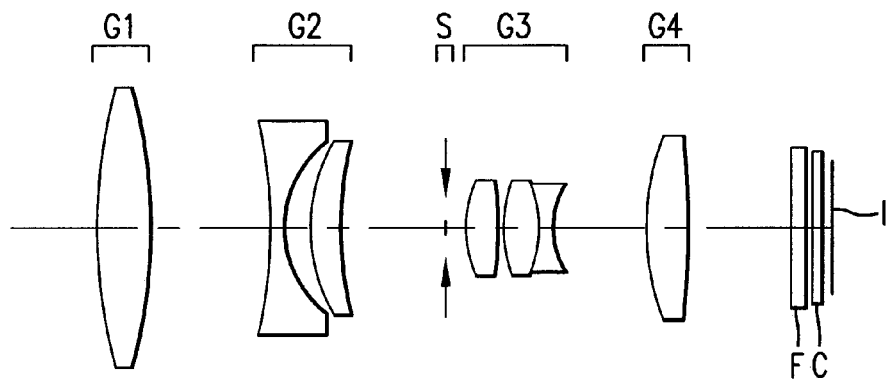
Figure 2C:
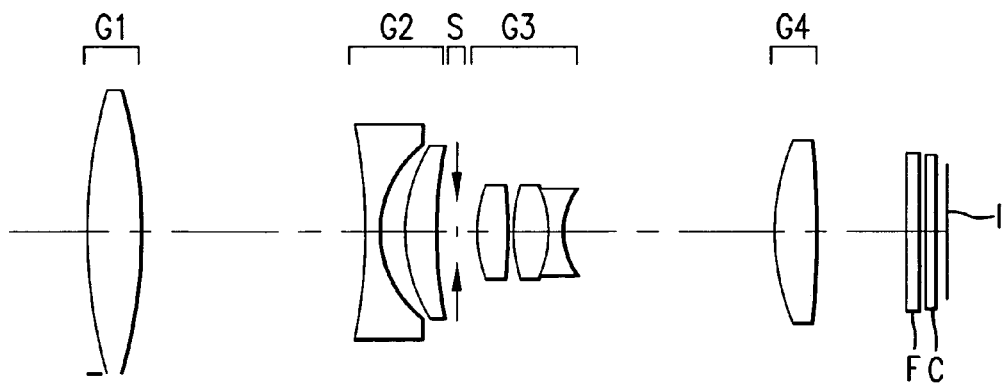

As shown in FIG. 2, Example 2 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves in a convex locus toward the object side while the space between it and the third lens group G3 grows wide and is positioned more on the object side at the telephoto end than at the wide-angle end, and is positioned more on the object side at the telephoto end than at the wide-angle end.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a double-convex positive lens and a double-concave negative lens; and the fourth lens group G4 is made up of one double-convex positive lens.

Six aspheric surfaces are used: two at both surfaces of the double-convex positive lens in the first lens group G1, two at both surfaces of the double-concave negative lens in the second lens group G2, and two at both surfaces of the double-convex positive lens that is the single lens in the third lens group G3.

EXAMPLE 3

Figure 3A:
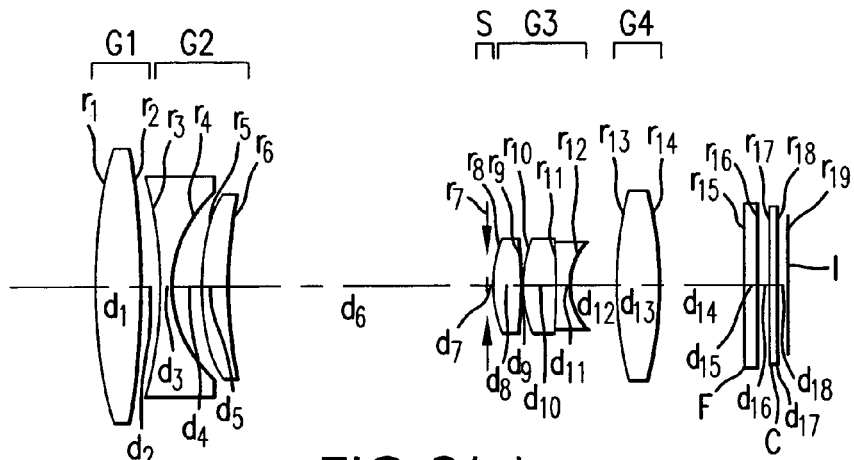
FIG. 3 is illustrative, as in FIG. 1, of Example 3 of the inventive zoom lens.
Figure 3B:
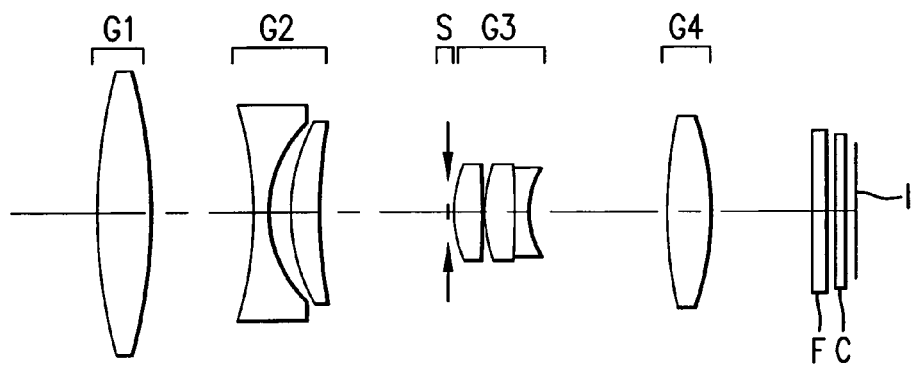
Figure 3C:
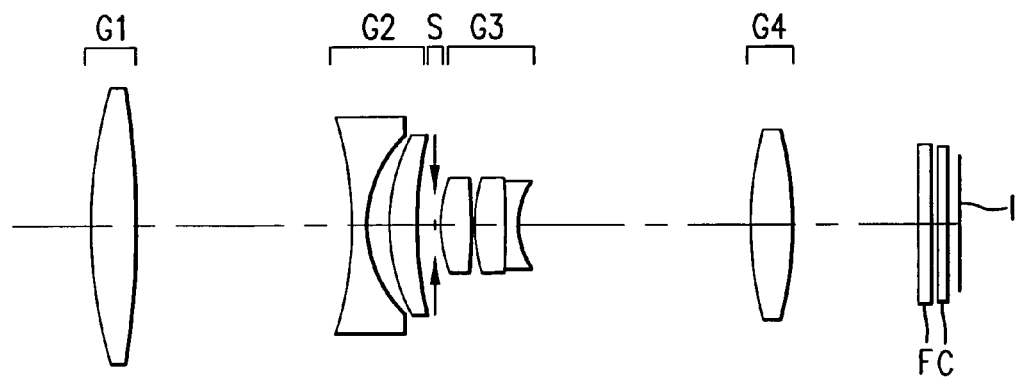

As shown in FIG. 3, Example 3 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a double-convex positive lens and a double-concave negative lens; and the fourth lens group G4 is made up of one double-convex positive lens.

Six aspheric surfaces are used: two at both surfaces of the double-convex positive lens in the first lens group G1, two at both surfaces of the double-concave negative lens in the second lens group G2, and two at both surfaces of the double-convex positive lens that is the single lens in the third lens group G3.

EXAMPLE 4

Figure 4A:
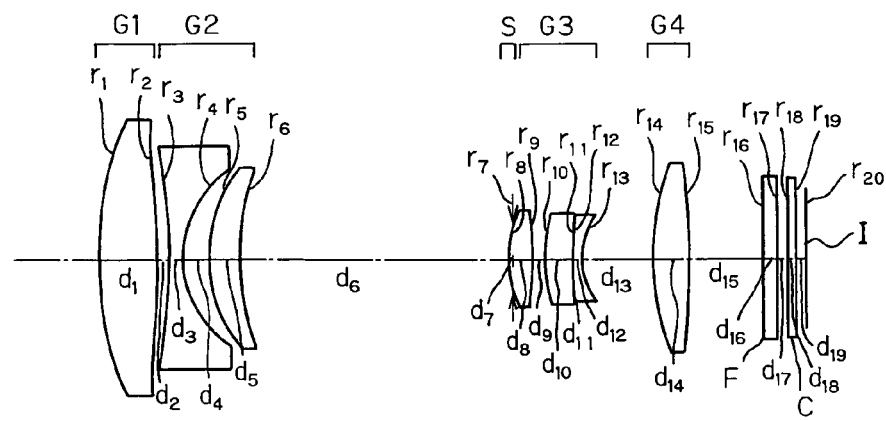
FIG. 4 is illustrative, as in FIG. 1, of Example 4 of the inventive zoom lens.
Figure 4B:
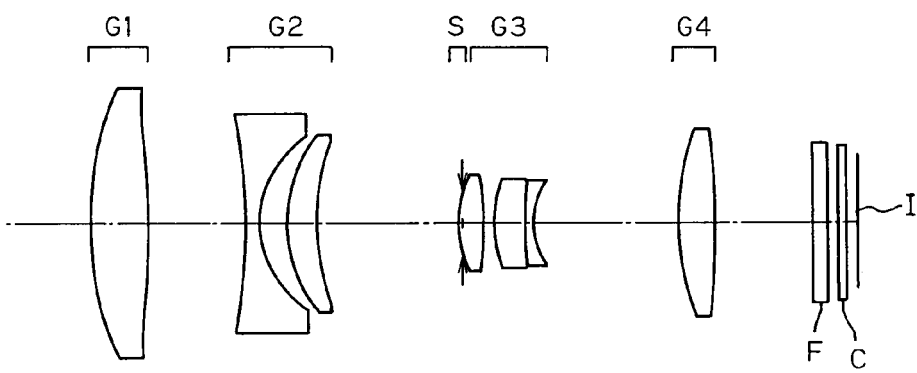
Figure 4C:
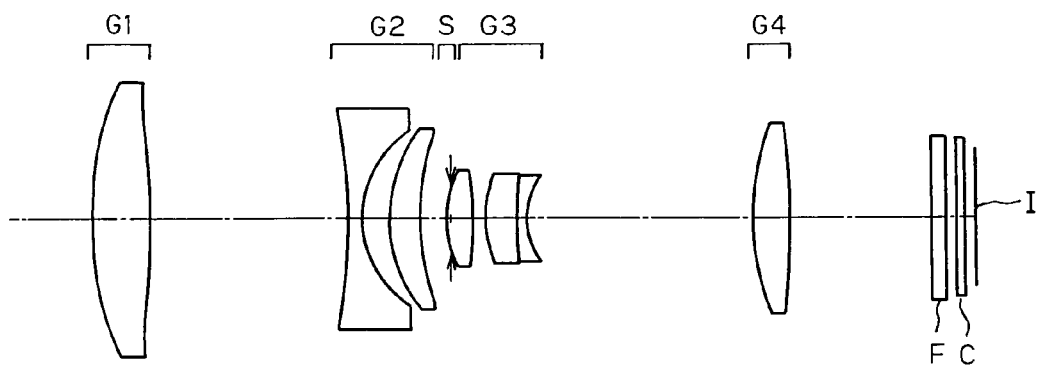

As shown in FIG. 4, Example 4 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a positive meniscus lens convex on its object side and a negative meniscus lens convex on its object side; and the fourth lens group G4 is made up of one double-convex positive lens.

Five aspheric surfaces are used: two at both surfaces of the double-convex positive lens in the first lens group G1, two at both surfaces of the double-concave negative lens in the second lens group G2, and one at the object-side surface of the double-convex positive lens that is the single lens in the third lens group G3.

It is here noted that the aperture stop S is positioned more on the image side than the apex of the convex surface located in, and nearest to the object side of, the third lens group G3, and the convex surface located in, and nearest to the object side of, the third lens group G3 makes its way into a part of the opening in the aperture stop S.

EXAMPLE 5

Figure 5A:
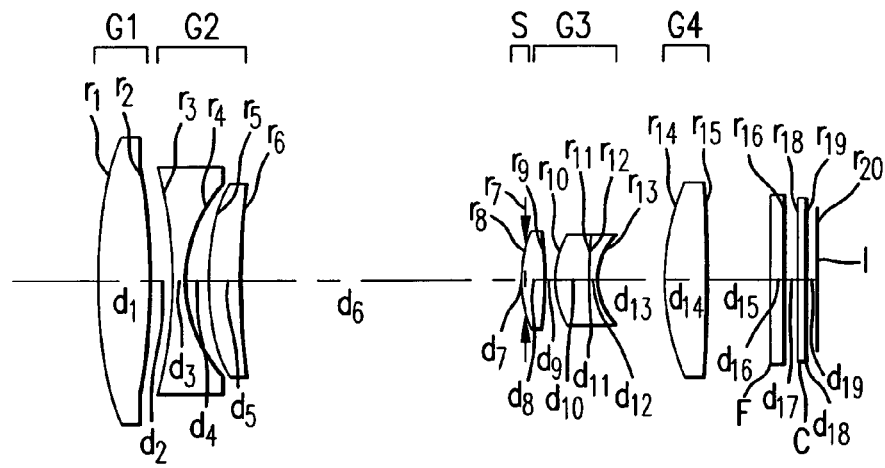
FIG. 5 is illustrative, as in FIG. 1, of Example 5 of the inventive zoom lens.
Figure 5B:
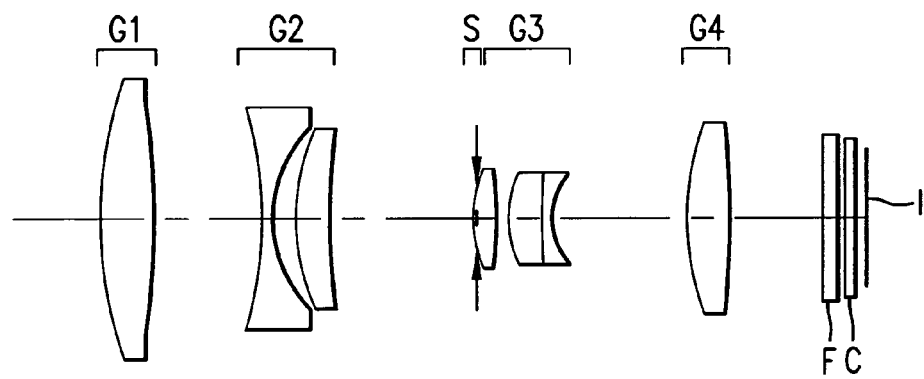
Figure 5C:
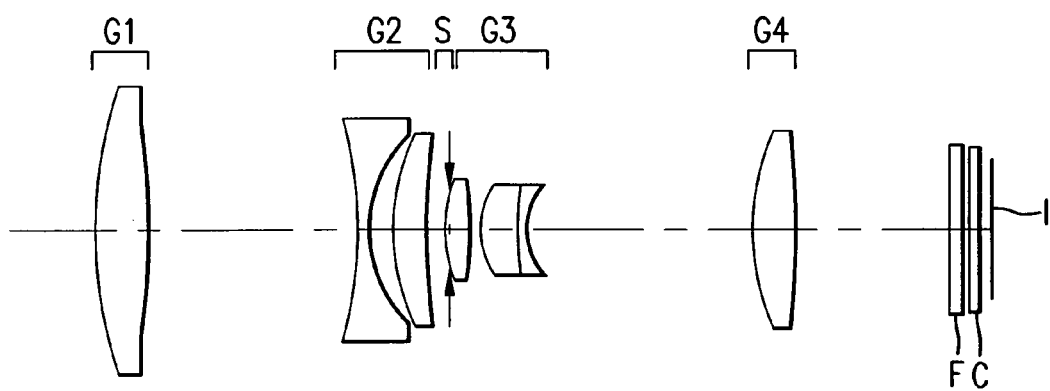

As shown in FIG. 5, Example 5 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a positive meniscus lens convex on its object side and a negative meniscus lens convex on its object side; and the fourth lens group G4 is made up of one double-convex positive lens.

Five aspheric surfaces are used: two at both surfaces of the double-convex positive lens in the first lens group G1, two at both surfaces of the double-concave negative lens in the second lens group G2, and one at the object-side surface of the double-convex positive lens that is the single lens in the third lens group G3.

It is here noted that the aperture stop S is positioned more on the image side than the apex of the convex surface located in, and nearest to the object side of, the third lens group G3, and the convex surface located in, and nearest to the object side of, the third lens group G3 makes its way into a part of the opening in the aperture stop S.

EXAMPLE 6

Figure 6A:
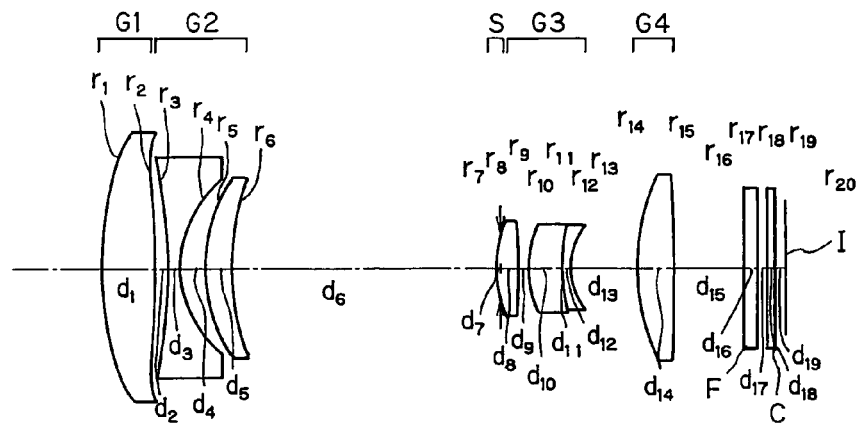
FIG. 6 is illustrative, as in FIG. 1, of Example 6 of the inventive zoom lens.
Figure 6B:
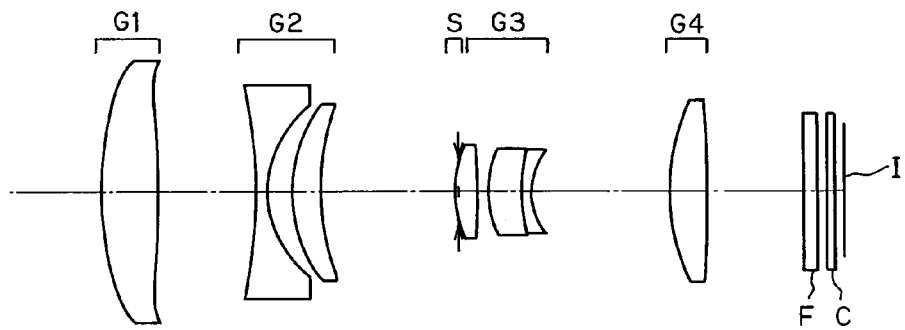
Figure 6C:
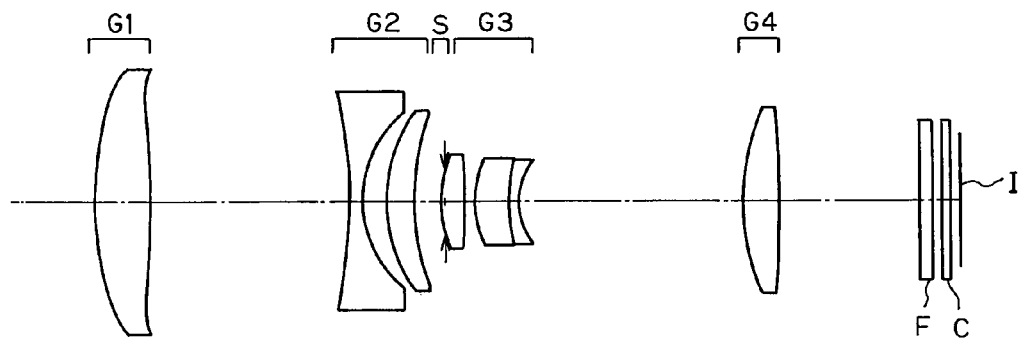

As shown in FIG. 6, Example 6 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a positive meniscus lens convex on its object side and a negative meniscus lens convex on its object side; and the fourth lens group G4 is made up of one double-convex positive lens.

Five aspheric surfaces are used: two at both surfaces of the double-convex positive lens in the first lens group G1, two at both surfaces of the double-concave negative lens in the second lens group G2, and one at the object-side surface of the double-convex positive lens that is the single lens in the third lens group G3.

It is here noted that the aperture stop S is positioned more on the image side than the apex of the convex surface located in, and nearest to the object side of, the third lens group G3, and the convex surface located in, and nearest to the object side of, the third lens group G3 makes its way into a part of the opening in the aperture stop S.

EXAMPLE 7

Figure 7A:
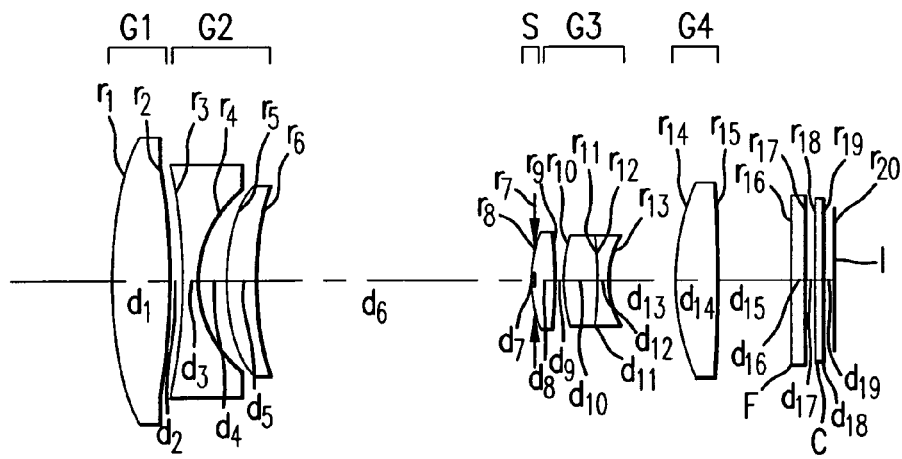
FIG. 7 is illustrative, as in FIG. 1, of Example 7 of the inventive zoom lens.
Figure 7B:
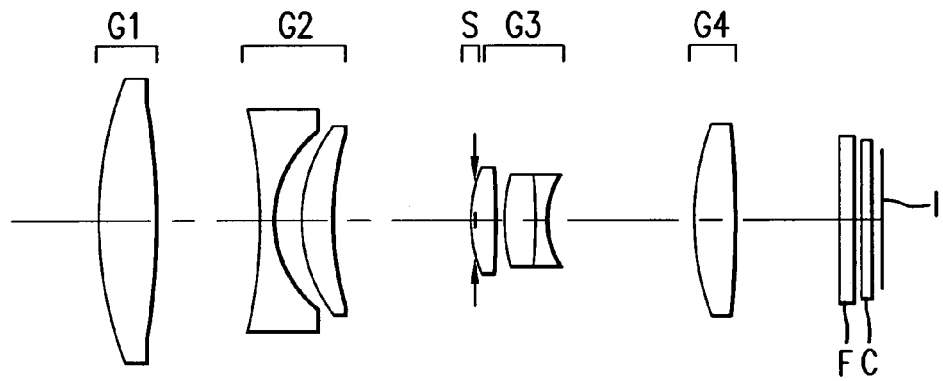
Figure 7C:
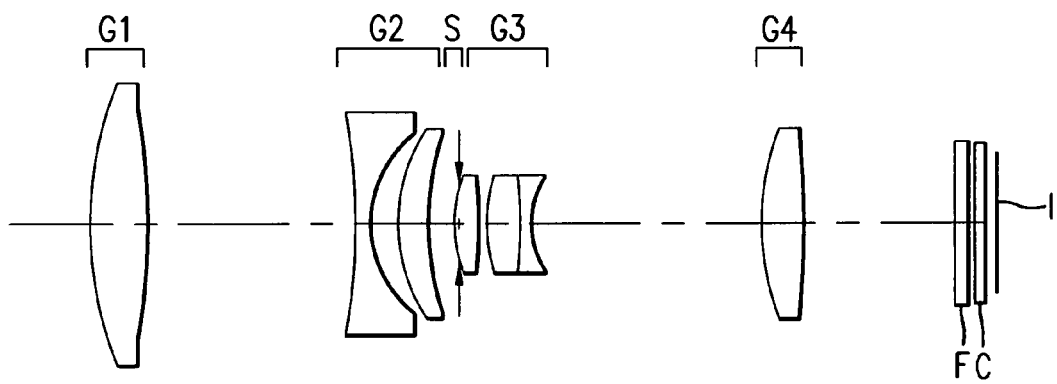

As shown in FIG. 7, Example 7 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a double-convex positive lens and a double-concave negative lens; and the fourth lens group G4 is made up of one double-convex positive lens.

Six aspheric surfaces are used: two at both surfaces of the double-convex positive lens in the first lens group G1, two at both surfaces of the double-concave negative lens in the second lens group G2, and two at both surfaces of the double-convex positive lens that is the single lens in the third lens group G3.

It is here noted that the aperture stop S is positioned more on the image side than the apex of the convex surface located in, and nearest to the object side of, the third lens group G3, and the convex surface located in, and nearest to the object side of, the third lens group G3 makes its way into a part of the opening in the aperture stop S.

EXAMPLE 8

Figure 8A:
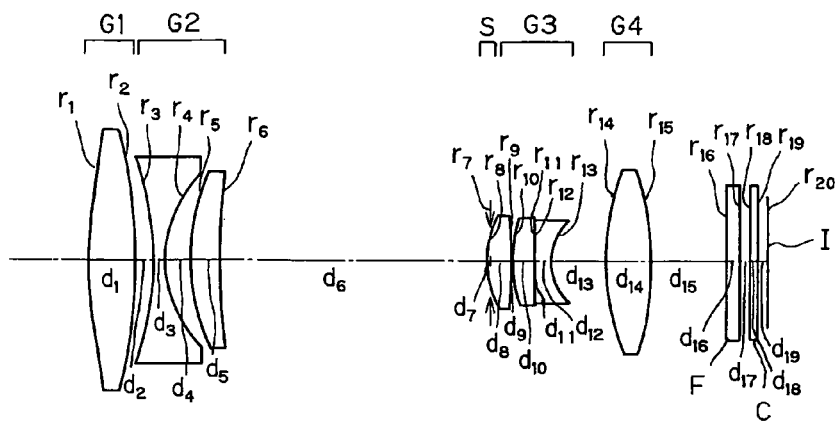
FIG. 8 is illustrative, as in FIG. 1, of Example 8 of the inventive zoom lens.
Figure 8B:
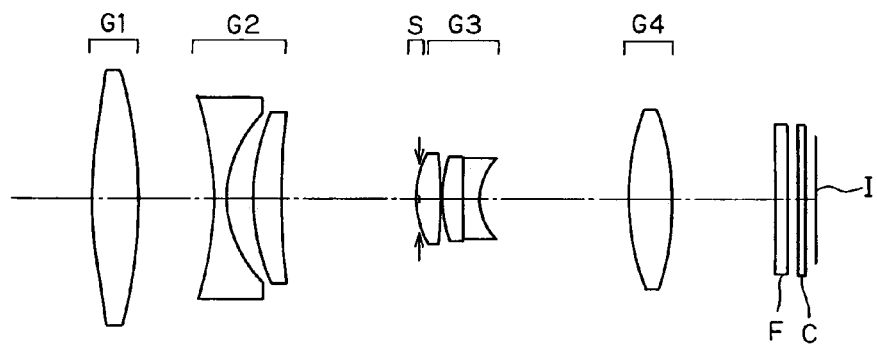
Figure 8C:
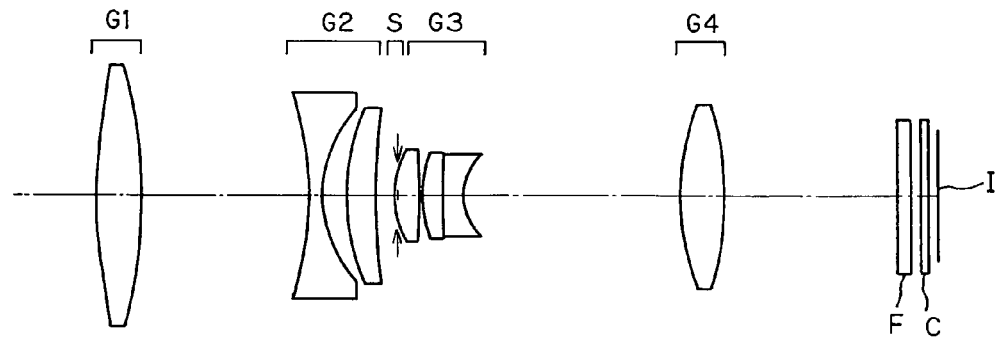

As shown in FIG. 8, Example 8 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a positive meniscus lens convex on its object side and a negative meniscus lens convex on its object side; and the fourth lens group G4 is made up of one double-convex positive lens.

Six aspheric surfaces are used: two at both surfaces of the double-convex positive lens in the first lens group G1, two at both surfaces of the double-concave negative lens in the second lens group G2, and two at both surfaces of the double-convex positive lens in the fourth lens group G4.

It is here noted that the aperture stop S is positioned more on the image side than the apex of the convex surface located in, and nearest to the object side of, the third lens group G3, and the convex surface located in, and nearest to the object side of, the third lens group G3 makes its way into a part of the opening in the aperture stop S.

EXAMPLE 9

Figure 9A:
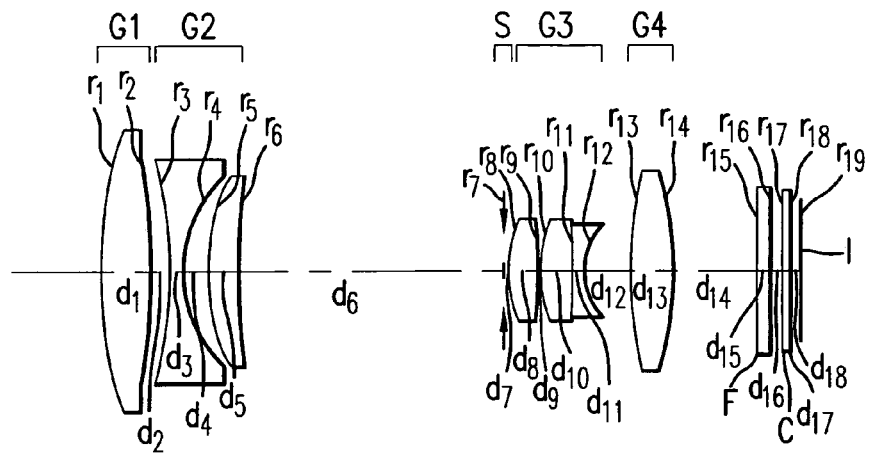
FIG. 9 is illustrative, as in FIG. 1, of Example 9 of the inventive zoom lens.
Figure 9B:
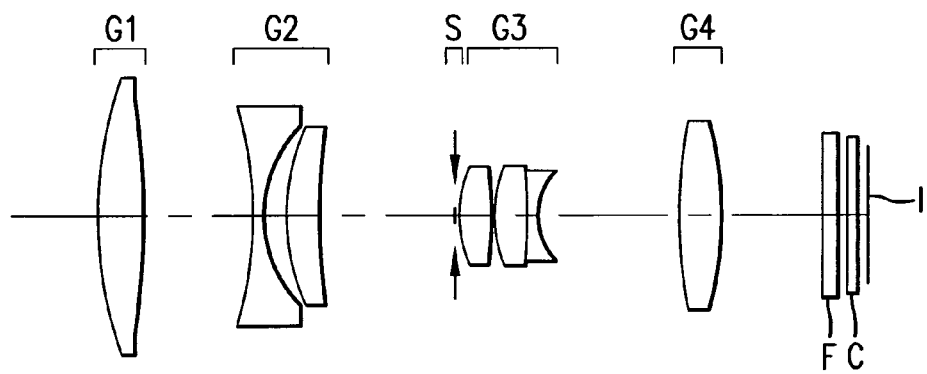
Figure 9C:
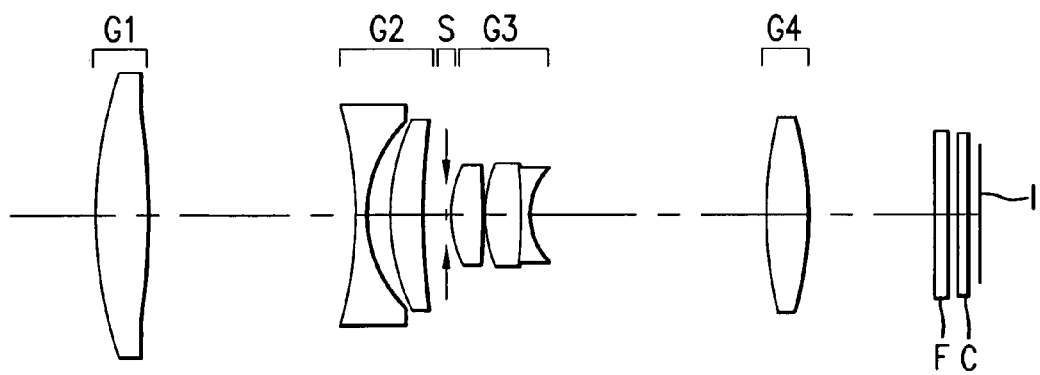

As shown in FIG. 9, Example 9 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a double-convex positive lens and a double-concave negative lens; and the fourth lens group G4 is made up of one double-convex positive lens.

Six aspheric surfaces are used: two at both surfaces of the double-convex positive lens in the first lens group G1, two at both surfaces of the double-concave negative lens in the second lens group G2, and two at both surfaces of the double-convex positive lens that is the single lens in the third lens group G3.

EXAMPLE 10

Figure 10A:
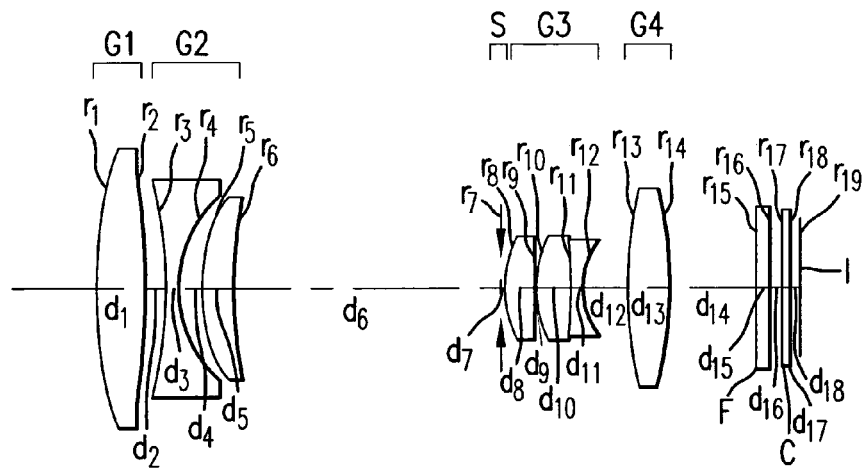
FIG. 10 is illustrative, as in FIG. 1, of Example 10 of the inventive zoom lens.
Figure 10B:
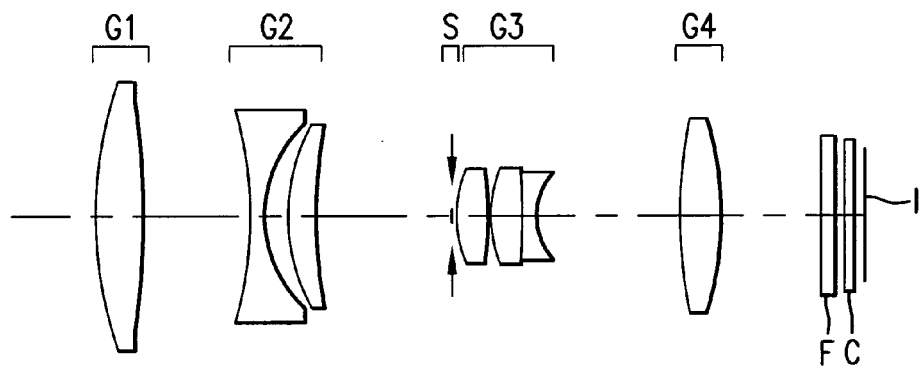
Figure 10C:
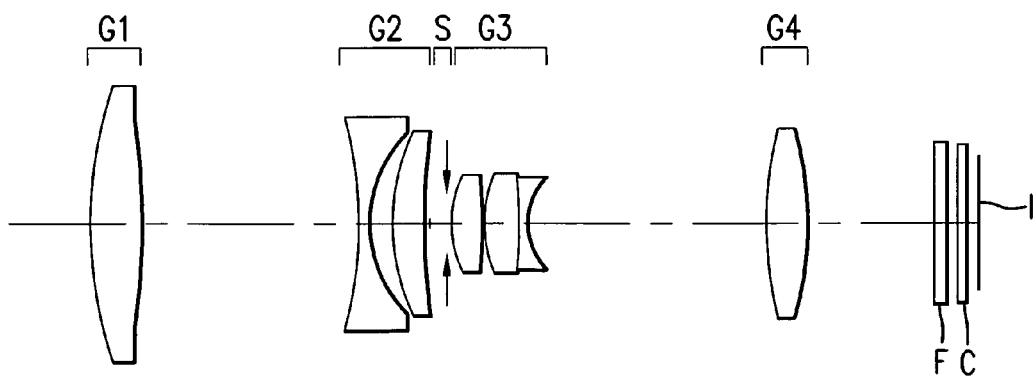
Figure 11A:
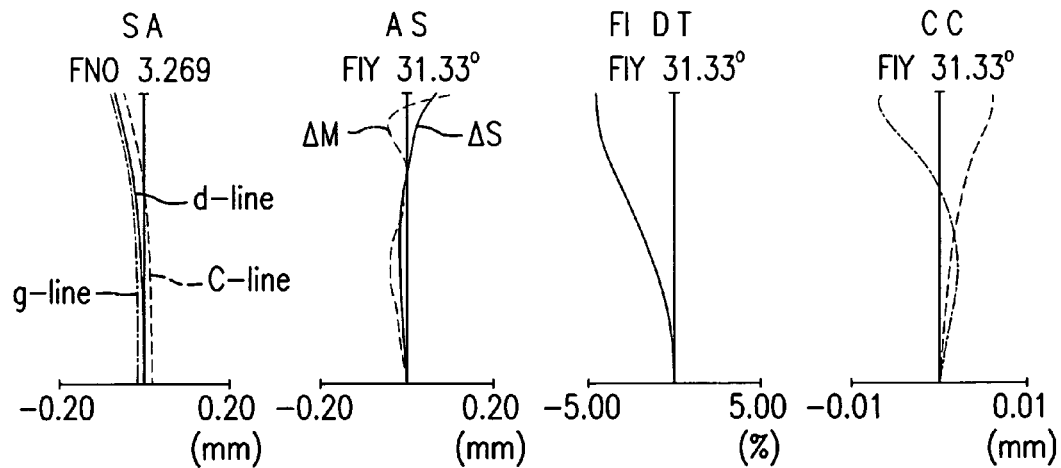
FIG. 11 is an aberration diagram for Example 1 upon focusing on an object point at infinity.
Figure 11B:
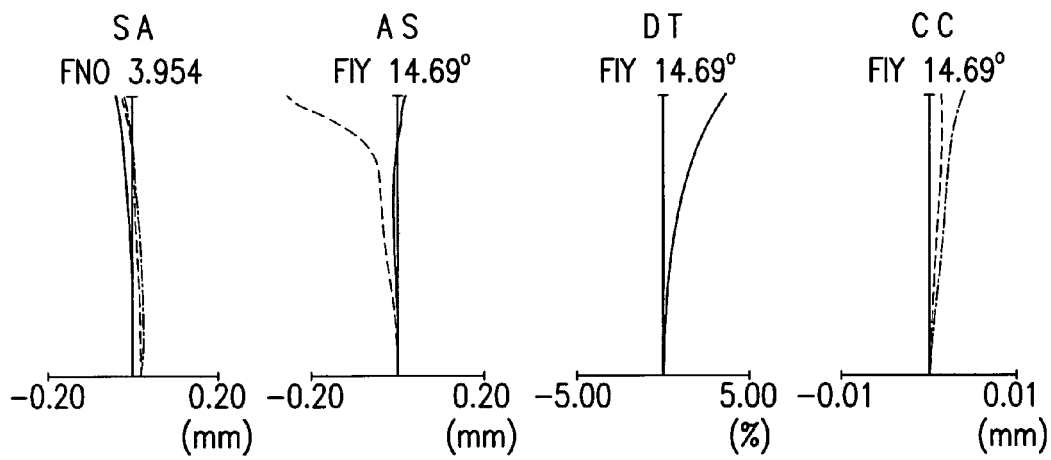
Figure 11C:
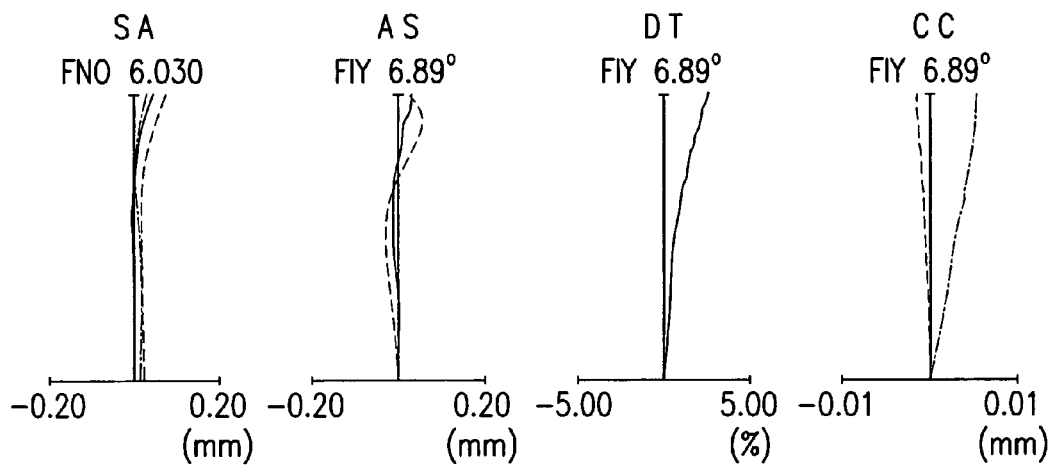
Figure 12A:
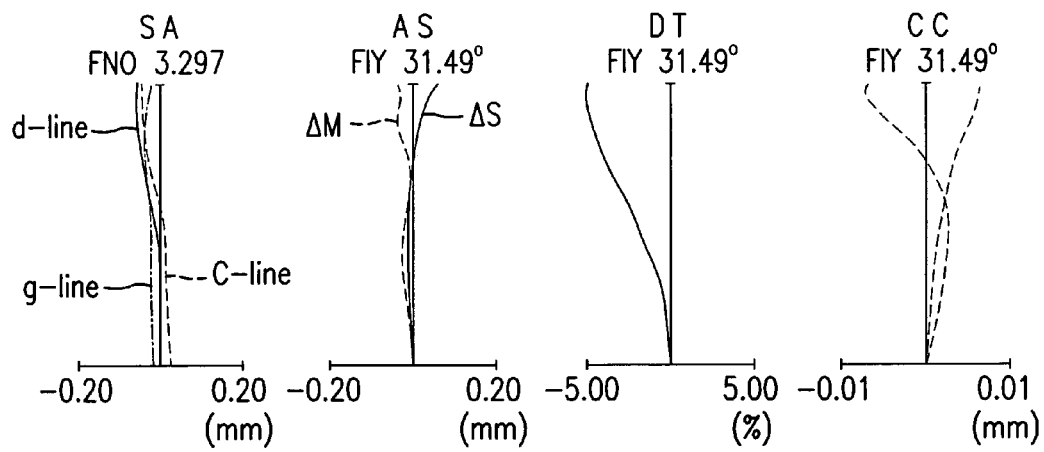
FIG. 12 is an aberration diagram for Example 2 upon focusing on an object point at infinity.
Figure 12B:
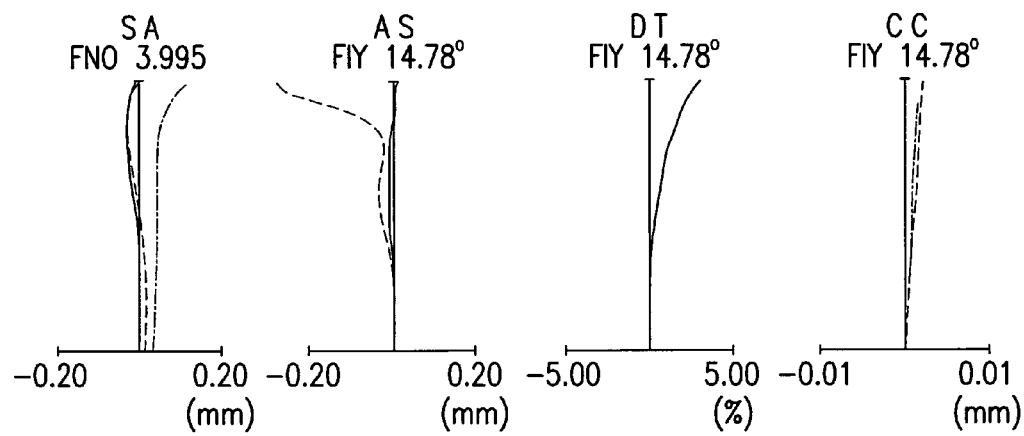
Figure 12C:
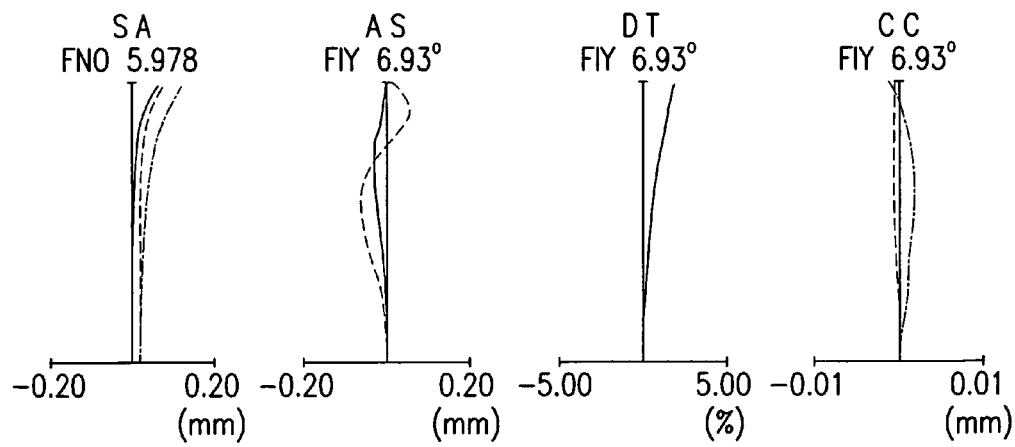
Figure 13A:
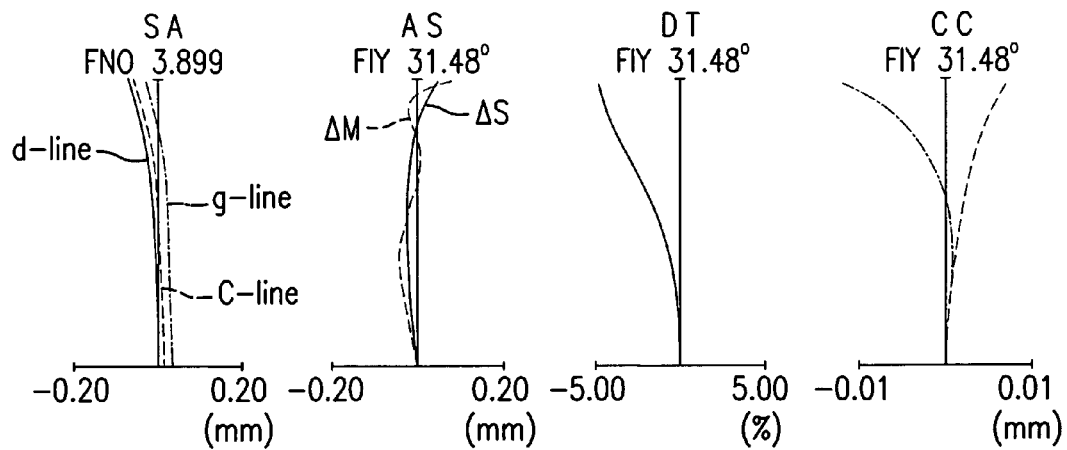
FIG. 13 is an aberration diagram for Example 3 upon focusing on an object point at infinity.
Figure 13B:
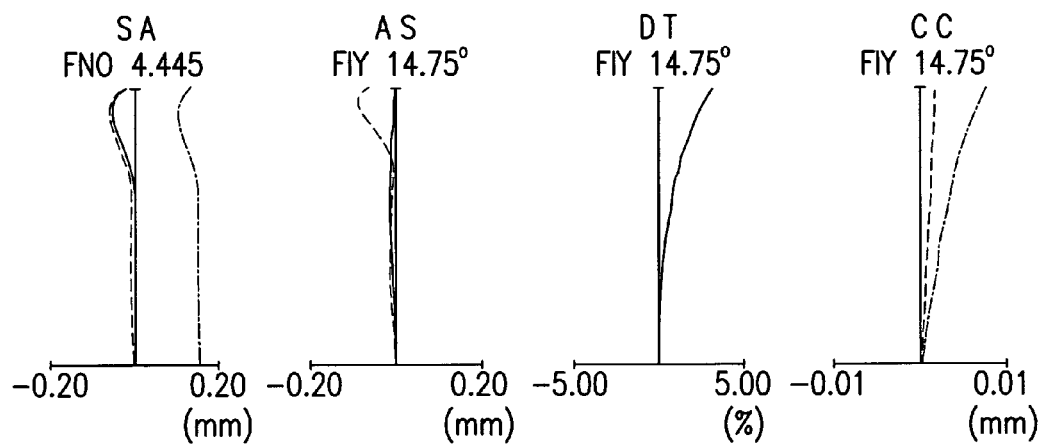
Figure 13C:
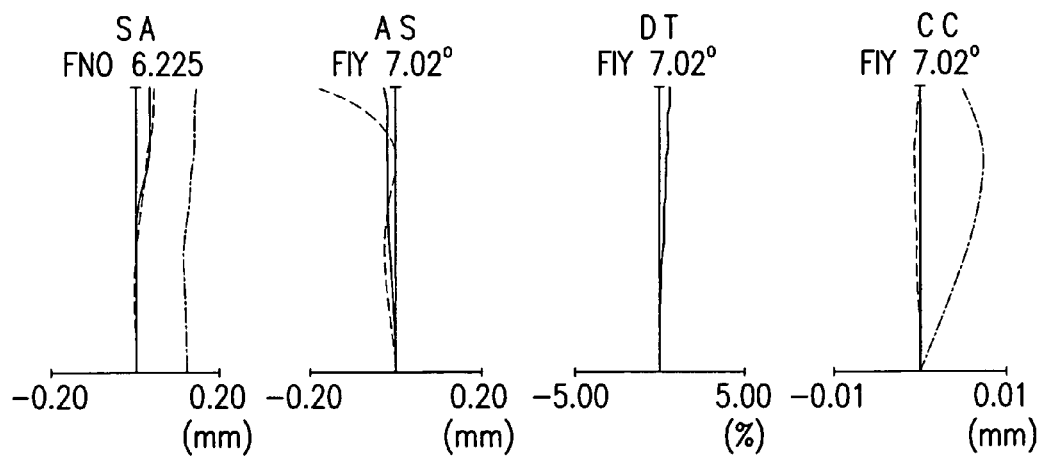
Figure 14A:
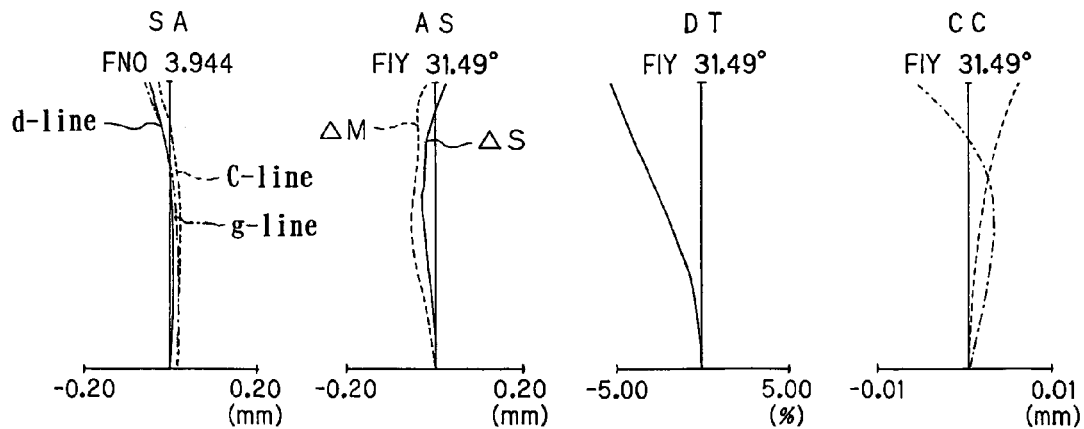
FIG. 14 is an aberration diagram for Example 4 upon focusing on an object point at infinity.
Figure 14B:
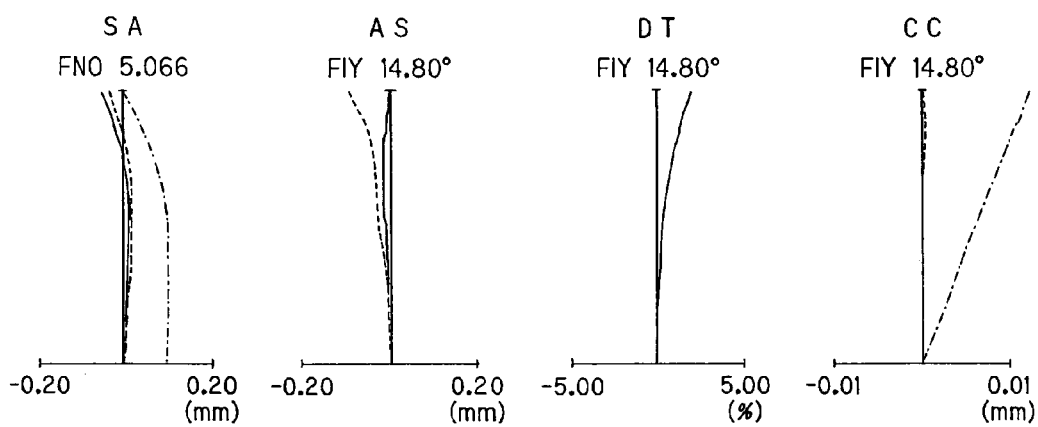
Figure 14C:
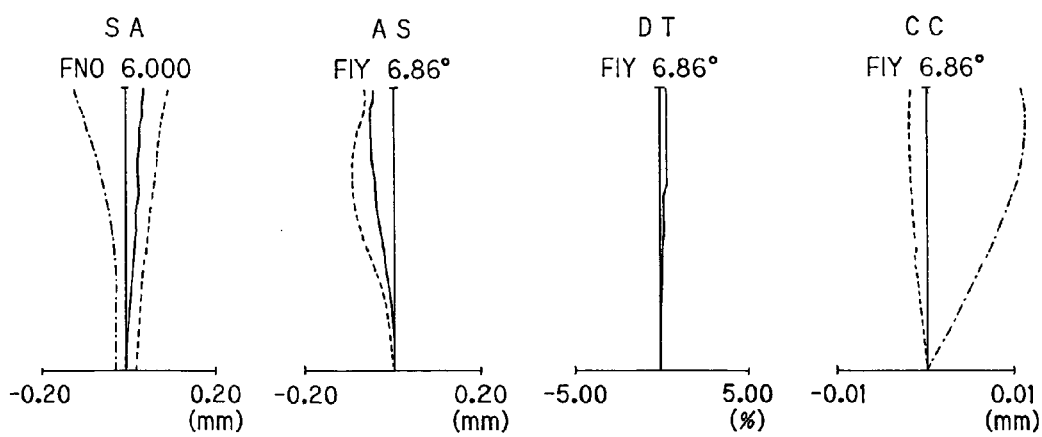
Figure 15A:
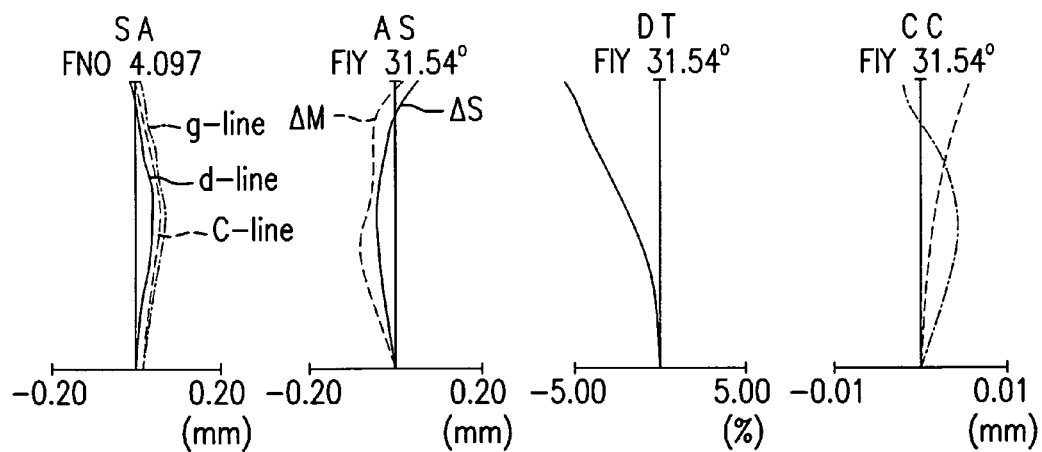
FIG. 15 is an aberration diagram for Example 5 upon focusing on an object point at infinity.
Figure 15B:
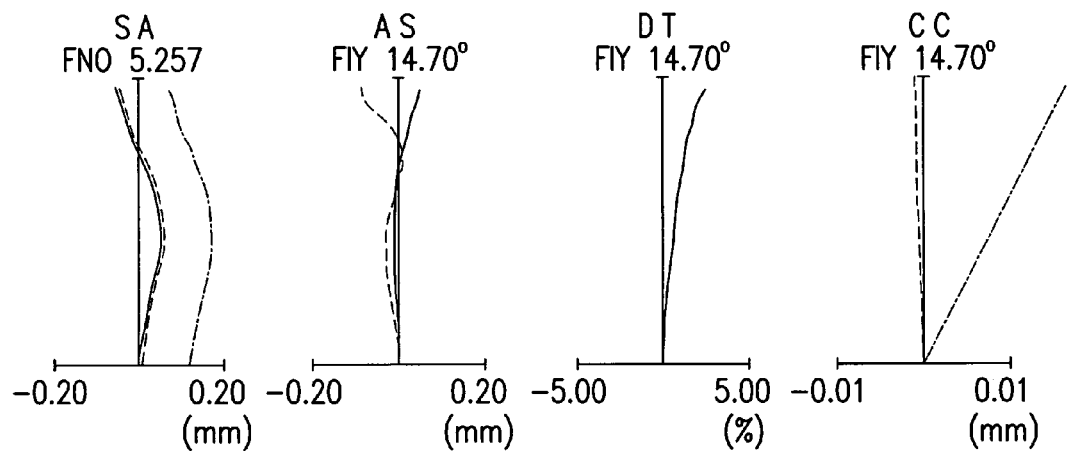
Figure 15C:
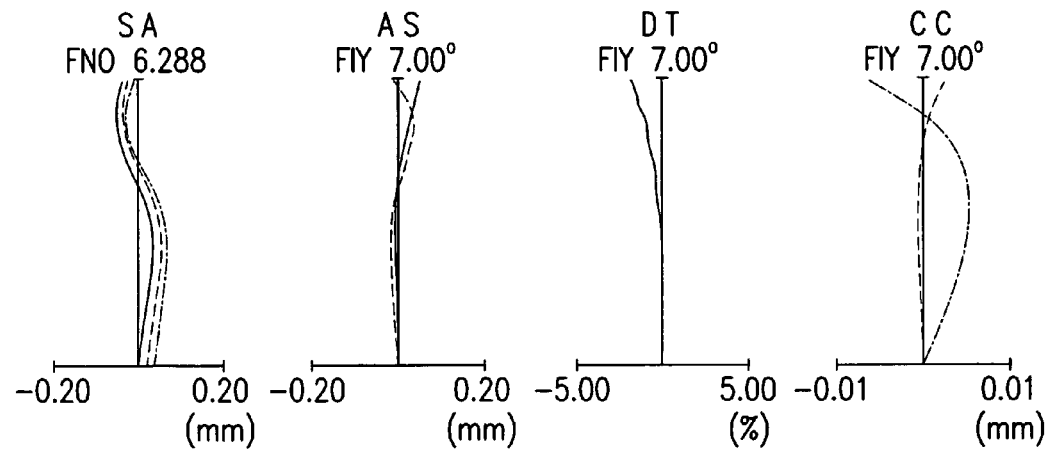
Figure 16A:
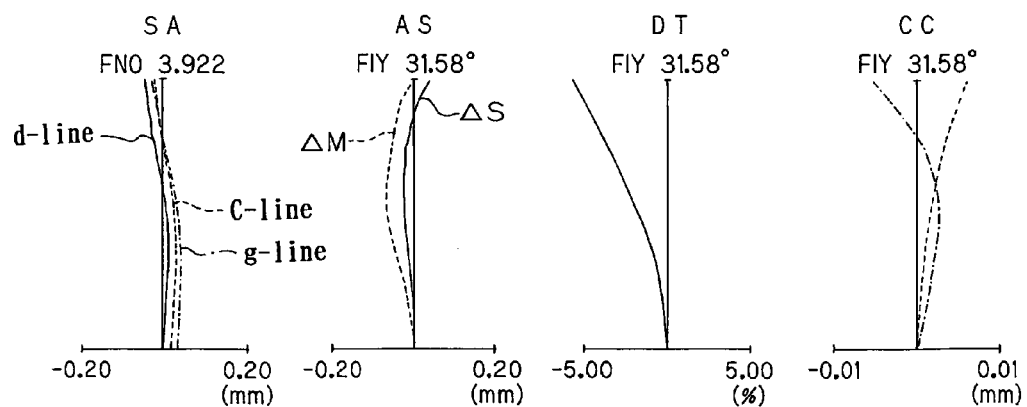
FIG. 16 is an aberration diagram for Example 6 upon focusing on an object point at infinity.
Figure 16B:
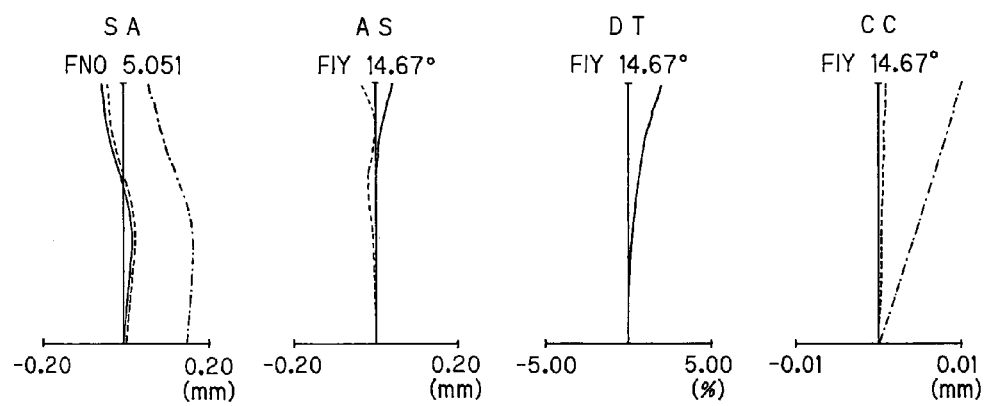
Figure 16C:
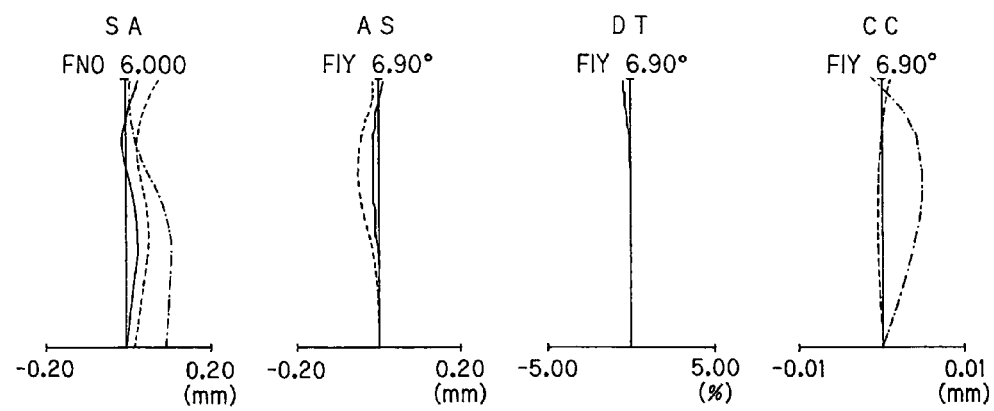
Figure 17A:
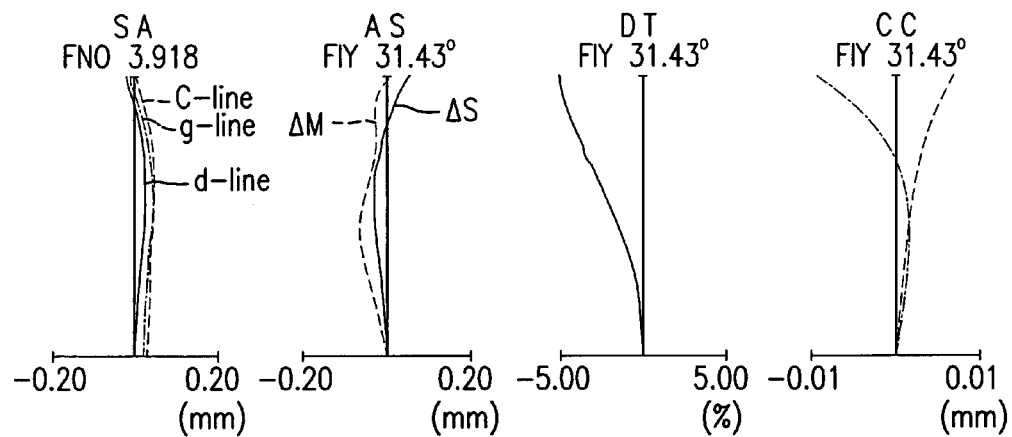
FIG. 17 is an aberration diagram for Example 7 upon focusing on an object point at infinity.
Figure 17B:
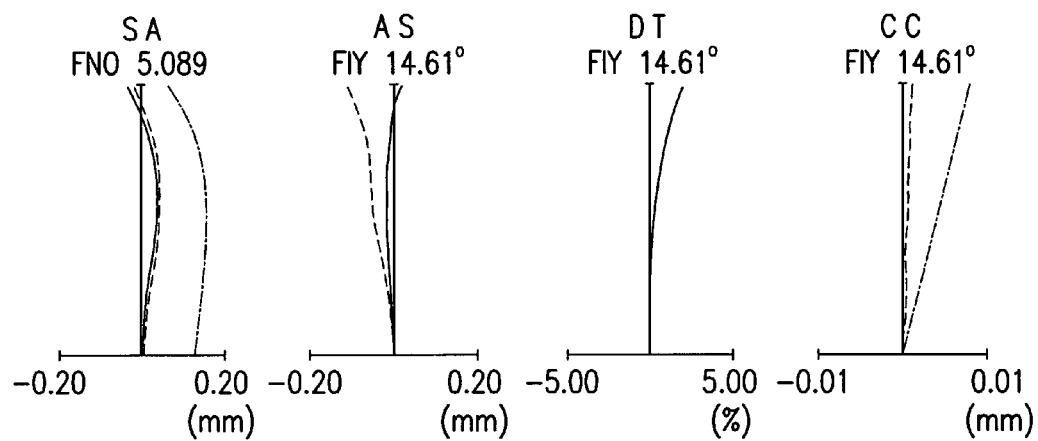
Figure 17C:
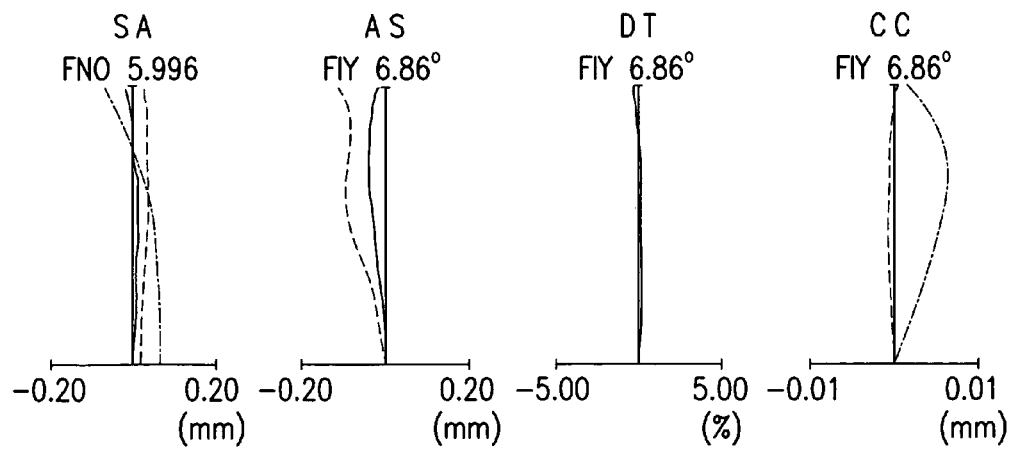
Figure 18A:
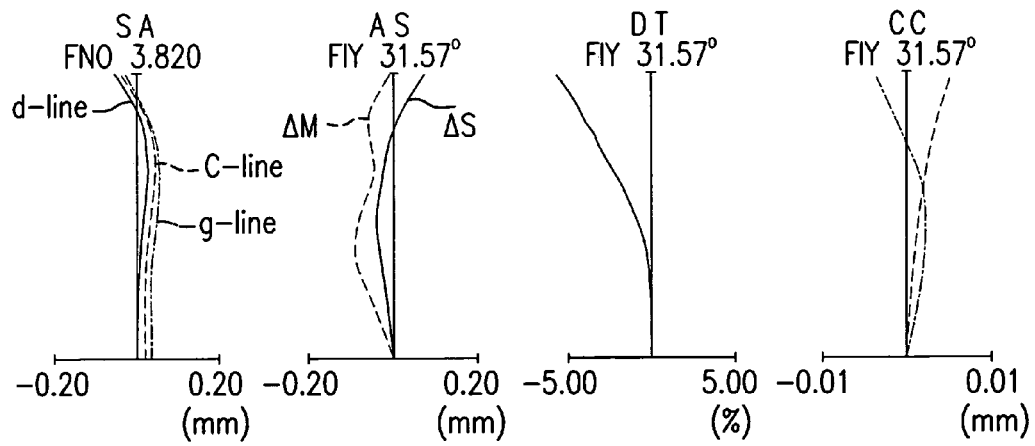
FIG. 18 is an aberration diagram for Example 8 upon focusing on an object point at infinity.
Figure 18B:
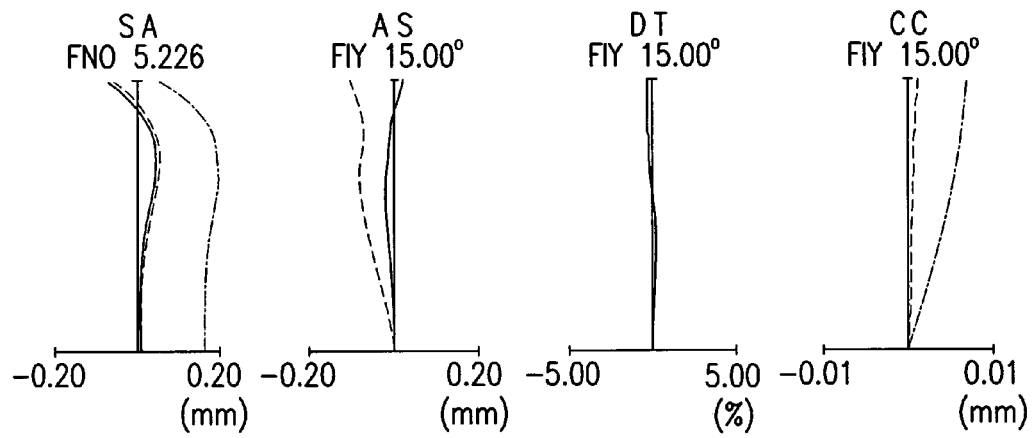
Figure 18C:
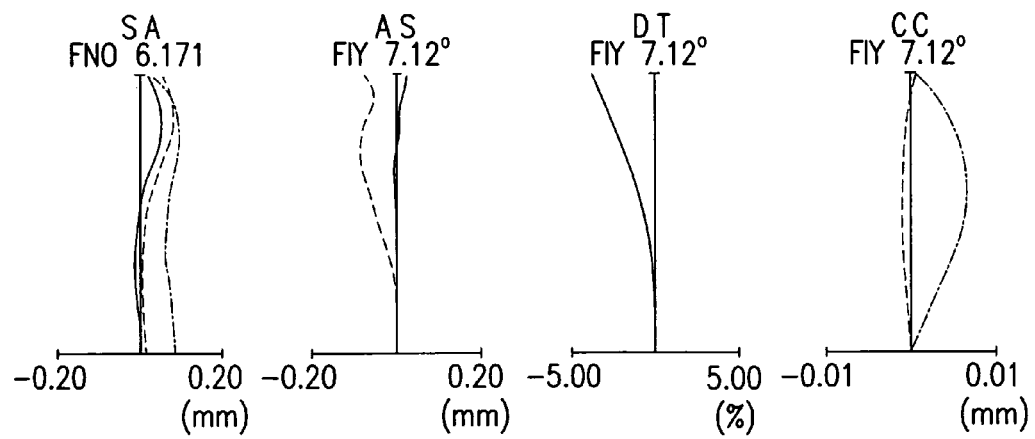
Figure 19A:
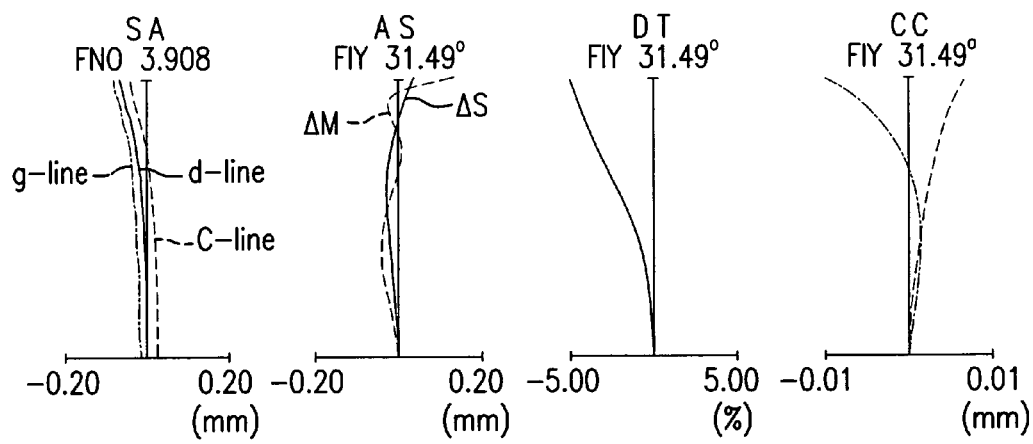
FIG. 19 is an aberration diagram for Example 9 upon focusing on an object point at infinity.
Figure 19B:
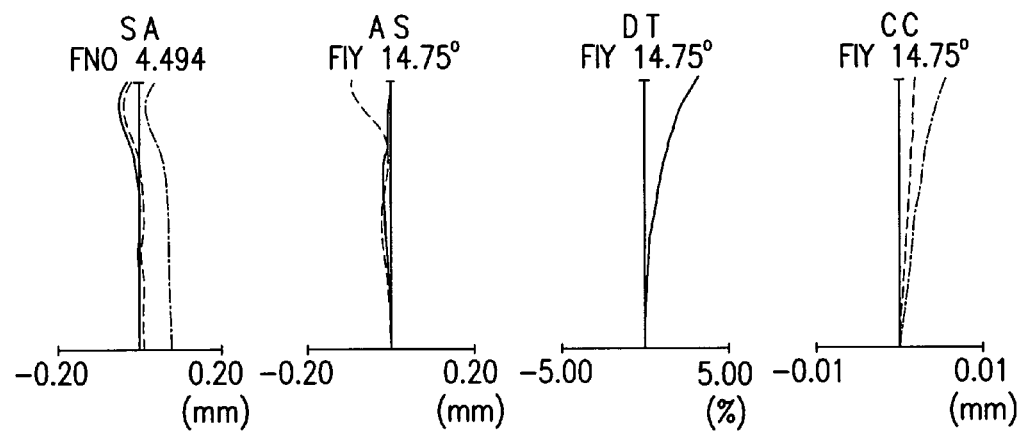
Figure 19C:
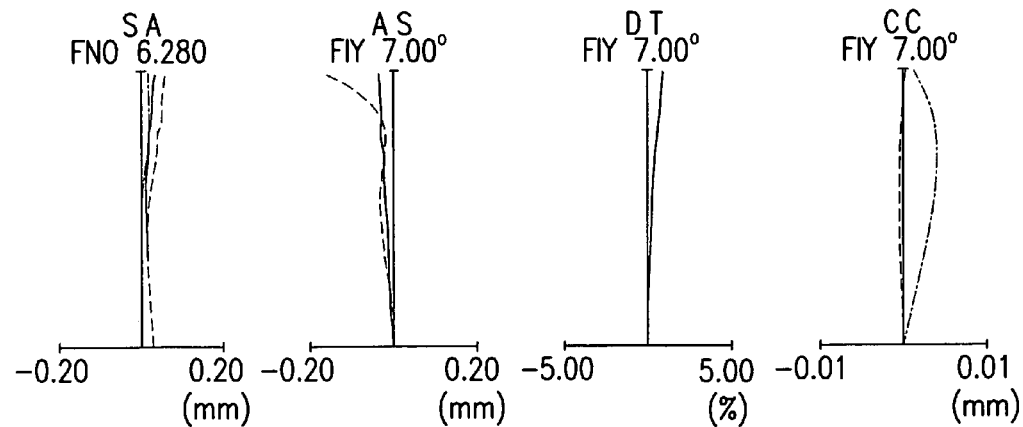
Figure 20A:
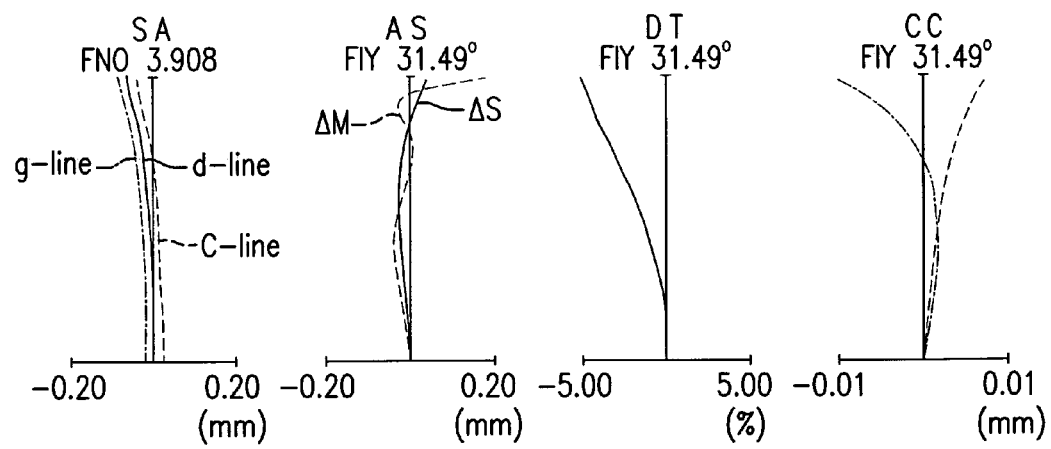
FIG. 20 is an aberration diagram for Example 10 upon focusing on an object point at infinity.
Figure 20B:
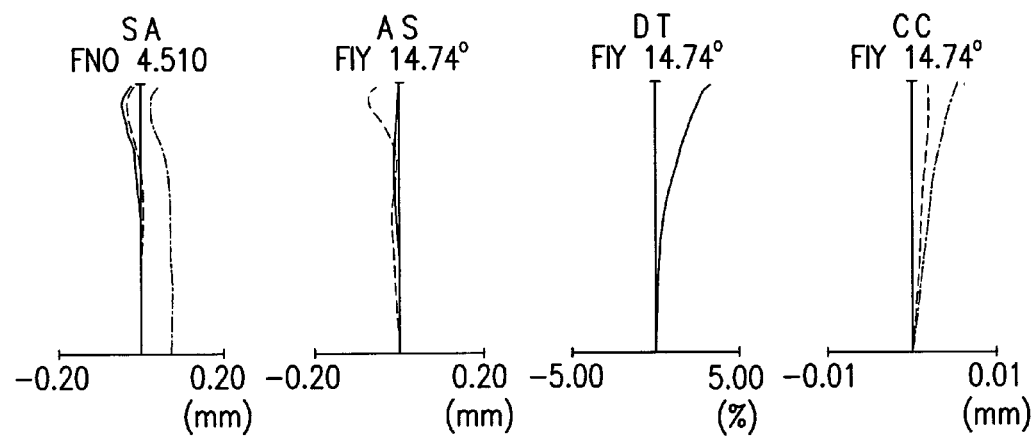
Figure 20C:
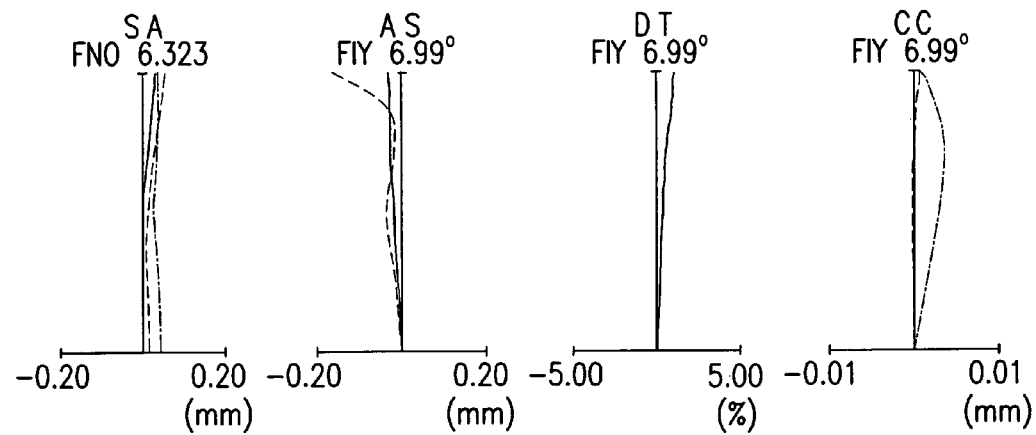

As shown in FIG. 10, Example 10 is directed to a zoom lens built up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves toward the object side, and the second lens group G2 moves in a convex locus toward the image side and is positioned more on the image side at the telephoto end than at the wide-angle end. The aperture stop S and the third lens group G3 move in unison toward the object side, and the fourth lens group G4 moves toward the object side while the space between it and the third lens group G3 grows wide.

In order from the object side of the zoom lens, the first lens group G1 is made up of one double-convex positive lens; the second lens group G2 is made up of a double-concave negative lens and a positive meniscus lens convex on its object side; the third lens group G3 is made up of a double-convex positive lens, and a cemented lens of a double-convex positive lens and a double-concave negative lens; and the fourth lens group G4 is made up of one double-convex positive lens.

Six aspheric surfaces are used: two at both surfaces of the double-convex positive lens in the first lens group G1, two at both surfaces of the double-concave negative lens in the second lens group G2, and two at both surfaces of the double-convex positive lens that is the single lens in the third lens group G3.

Set out below are the numerical data about each example. Symbols mentioned hereinafter but not hereinbefore have the following meanings:

f: the focal length of the whole system, $F_{NO}$: an F-number, $2\omega$: an angle of view, WE: the wide-angle end, ST: the intermediate state, TE: the telephoto end, $r_1, r_2, \ldots$: the radius of curvature of each lens surface, $d_1, d_2, \ldots$: the space between adjoining lens surfaces, $n_{d1}, n_{d2}, \ldots$: the d-line refractive index of each lens, and $v_{d1}, v_{d2}, \ldots$: the Abbe constant of each lens. Note here that aspheric surface is given by the following equation where x is an optical axis provided that the direction of travel of light is positive and y is a direction orthogonal to the optical axis.

$$x=(y^2/r)/[1+\{1-(K+1)(y/r)^2\}^{1/2}]$$

$$A_4y^4+A_6y^6+A_8y^8+A_{10}y^{10}$$

Here r is the paraxial radius of curvature, K is the conical coefficient, and $A_4, A_6, A_8, A_{10}$ and $A_{12}$ are the $4^{th}$-, $6^{th}$-, $8^{th}$-, and $10^{th}$-order aspheric coefficients, respectively.

Example 1

| | | | |
|---|---|---|---|
| $r_1$ = 23.934 (Aspheric) | $d_1$ = 3.07 | $n_{d1}$ = 1.49700 | $v_{d1}$ = 81.54 |
| $r_2$ = −42.835 (Aspheric) | $d_2$ = (Variable) | | |
| $r_3$ = −19.839 (Aspheric) | $d_3$ = 1.01 | $n_{d2}$ = 1.80610 | $v_{d2}$ = 40.92 |
| $r_4$ = 5.567 (Aspheric) | $d_4$ = 1.40 | | |
| $r_5$ = 9.356 | $d_5$ = 1.99 | $n_{d3}$ = 1.92286 | $v_{d3}$ = 20.88 |
| $r_6$ = 24.062 | $d_6$ = (Variable) | | |
| $r_7$ = ∞ (Stop) | $d_7$ = 1.20 | | |
| $r_8$ = 5.751 (Aspheric) | $d_8$ = 2.32 | $n_{d4}$ = 1.66895 | $v_{d4}$ = 42.79 |
| $r_9$ = −15.270 (Aspheric) | $d_9$ = 0.16 | | |
| $r_{10}$ = 13.075 | $d_{10}$ = 1.68 | $n_{d5}$ = 1.72916 | $v_{d5}$ = 54.68 |
| $r_{11}$ = −12.975 | $d_{11}$ = 0.73 | $n_{d6}$ = 1.84666 | $v_{d6}$ = 23.78 |
| $r_{12}$ = 4.161 | $d_{12}$ = (Variable) | | |
| $r_{13}$ = 14.113 | $d_{13}$ = 2.30 | $n_{d7}$ = 1.84666 | $v_{d7}$ = 23.78 |
| $r_{14}$ = −213.721 | $d_{14}$ = (Variable) | | |
| $r_{15}$ = ∞ | $d_{15}$ = 0.81 | $n_{d8}$ = 1.54771 | $v_{d8}$ = 62.84 |
| $r_{16}$ = ∞ | $d_{16}$ = 0.57 | | |
| $r_{17}$ = ∞ | $d_{17}$ = 0.47 | $n_{d9}$ = 1.51633 | $v_{d9}$ = 64.14 |
| $r_{18}$ = ∞ | $d_{18}$ = 0.64 | | |
| $r_{19}$ = ∞ (Imaging plane) | | | |

Aspherical Coefficients

1st surface

K = 0.000
$A_4$ = −4.31307 × 10$^{-5}$
$A_6$ = 4.47328 × 10$^{-7}$
$A_8$ = −1.42154 × 10$^{-8}$
$A_{10}$ = 7.92701 × 10$^{-11}$

2nd surface

K = 0.000
$A_4$ = 3.66261 × 10$^{-5}$
$A_6$ = 1.09806 × 10$^{-6}$
$A_8$ = −3.13291 × 10$^{-8}$
$A_{10}$ = 2.69041 × 10$^{-10}$

3rd surface

K = 0.000
$A_4$ = 2.62138 × 10$^{-4}$
$A_6$ = 4.61213 × 10$^{-6}$
$A_8$ = −2.80283 × 10$^{-7}$
$A_{10}$ = 2.50090 × 10$^{-9}$

4th surface

K = 0.000
$A_4$ = −3.66221 × 10$^{-4}$
$A_6$ = 1.28582 × 10$^{-5}$
$A_8$ = −1.97532 × 10$^{-7}$
$A_{10}$ = −5.10749 × 10$^{-8}$

8th surface

K = 0.519
$A_4$ = −1.09678 × 10$^{-3}$
$A_6$ = −1.22542 × 10$^{-5}$
$A_8$ = −3.95552 × 10$^{-6}$
$A_{10}$ = 2.30119 × 10$^{-7}$

9th surface

K = 0.000
$A_4$ = 1.94217 × 10$^{-4}$
$A_6$ = 7.31289 × 10$^{-6}$
$A_8$ = −3.40421 × 10$^{-6}$
$A_{10}$ = 3.05416 × 10$^{-7}$

Zooming Data (∞)

| | WE | ST | TE |
|---|---|---|---|
| f (mm) | 6.60 | 14.15 | 31.00 |
| $F_{NO}$ | 3.27 | 3.95 | 6.03 |
| 2ω (°) | 62.66 | 29.39 | 13.78 |
| $d_2$ | 1.09 | 7.20 | 13.17 |
| $d_6$ | 12.72 | 5.60 | 1.16 |
| $d_{12}$ | 2.03 | 5.10 | 12.70 |
| $d_{14}$ | 4.88 | 6.20 | 5.02 |

Example 2

| | | | |
|---|---|---|---|
| $r_1$ = 23.873 (Aspheric) | $d_1$ = 2.99 | $n_{d1}$ = 1.49700 | $v_{d1}$ = 81.54 |
| $r_2$ = −44.414 (Aspheric) | $d_2$ = (Variable) | | |
| $r_3$ = −20.859 (Aspheric) | $d_3$ = 0.96 | $n_{d2}$ = 1.80610 | $v_{d2}$ = 40.92 |
| $r_4$ = 5.834 (Aspheric) | $d_4$ = 1.40 | | |
| $r_5$ = 9.671 | $d_5$ = 1.89 | $n_{d3}$ = 1.92286 | $v_{d3}$ = 20.88 |
| $r_6$ = 23.735 | $d_6$ = (Variable) | | |
| $r_7$ = ∞ (Stop) | $d_7$ = 1.15 | | |
| $r_8$ = 6.858 (Aspheric) | $d_8$ = 1.98 | $n_{d4}$ = 1.68305 | $v_{d4}$ = 34.88 |
| $r_9$ = −27.454 (Aspheric) | $d_9$ = 0.16 | | |
| $r_{10}$ = 8.422 | $d_{10}$ = 2.18 | $n_{d5}$ = 1.72916 | $v_{d5}$ = 54.68 |
| $r_{11}$ = −7.642 | $d_{11}$ = 0.74 | $n_{d6}$ = 1.84666 | $v_{d6}$ = 23.78 |
| $r_{12}$ = 4.259 | $d_{12}$ = (Variable) | | |
| $r_{13}$ = 15.625 | $d_{13}$ = 2.35 | $n_{d7}$ = 1.84666 | $v_{d7}$ = 23.78 |
| $r_{14}$ = −63.767 | $d_{14}$ = (Variable) | | |
| $r_{15}$ = ∞ | $d_{15}$ = 0.81 | $n_{d8}$ = 1.54771 | $v_{d8}$ = 62.84 |
| $r_{16}$ = ∞ | $d_{16}$ = 0.57 | | |
| $r_{17}$ = ∞ | $d_{17}$ = 0.47 | $n_{d9}$ = 1.51633 | $v_{d9}$ = 64.14 |
| $r_{18}$ = ∞ | $d_{18}$ = 0.64 | | |
| $r_{19}$ = ∞ (Imaging plane) | | | |

Aspherical Coefficients

1st surface

K = 0.000
$A_4$ = −7.88447 × 10$^{-5}$
$A_6$ = 1.59276 × 10$^{-6}$
$A_8$ = −3.30030 × 10$^{-8}$
$A_{10}$ = 1.70193 × 10$^{-10}$

2nd surface

K = 0.000
$A_4$ = −8.23664 × 10$^{-5}$
$A_6$ = 3.02336 × 10$^{-6}$
$A_8$ = −7.05046 × 10$^{-8}$
$A_{10}$ = 5.38822 × 10$^{-10}$

3rd surface

K = 0.000
$A_4$ = 2.05452 × 10$^{-4}$
$A_6$ = 8.05408 × 10$^{-6}$
$A_8$ = −3.65123 × 10$^{-7}$
$A_{10}$ = 3.68265 × 10$^{-9}$

4th surface

K = 0.000
$A_4$ = −3.19761 × 10$^{-4}$
$A_6$ = 1.71624 × 10$^{-5}$
$A_8$ = −3.30855 × 10$^{-7}$
$A_{10}$ = −3.11653 × 10$^{-8}$

8th surface

K = 0.519
$A_4$ = −4.23790 × 10$^{-4}$

-continued $A_6 = -1.20850 \times 10^{-5}$
$A_8 = -2.19592 \times 10^{-6}$
$A_{10} = 1.45923 \times 10^{-7}$ 9th surface K = 0.000
$A_4 = 1.74510 \times 10^{-4}$
$A_6 = -2.67920 \times 10^{-5}$
$A_8 = 6.90209 \times 10^{-7}$
$A_{10} = 8.25924 \times 10^{-8}$ Zooming Data (∞)

|  | WE | ST | TE |
|---|---|---|---|
| f (mm) | 6.60 | 14.15 | 31.00 |
| $F_{NO}$ | 3.30 | 4.00 | 5.98 |
| 2ω (°) | 62.99 | 29.55 | 13.86 |
| $d_2$ | 1.00 | 7.15 | 13.26 |
| $d_6$ | 13.60 | 6.16 | 1.17 |
| $d_{12}$ | 2.09 | 5.52 | 12.48 |
| $d_{14}$ | 4.91 | 6.14 | 5.31 |

Example 3

| $r_1 = 26.571$ (Aspheric) | $d_1 = 2.73$ | $n_{d1} = 1.49700$ | $\nu_{d1} = 81.54$ |
|---|---|---|---|
| $r_2 = -39.710$ (Aspheric) | $d_2 = $ (Variable) | | |
| $r_3 = -19.292$ (Aspheric) | $d_3 = 0.81$ | $n_{d2} = 1.80610$ | $\nu_{d2} = 40.92$ |
| $r_4 = 6.493$ (Aspheric) | $d_4 = 1.40$ | | |
| $r_5 = 11.234$ | $d_5 = 1.61$ | $n_{d3} = 1.92286$ | $\nu_{d3} = 20.88$ |
| $r_6 = 29.140$ | $d_6 = $ (Variable) | | |
| $r_7 = \infty$ (Stop) | $d_7 = 0.26$ | | |
| $r_8 = 5.949$ (Aspheric) | $d_8 = 1.75$ | $n_{d4} = 1.63825$ | $\nu_{d4} = 41.91$ |
| $r_9 = -38.576$ (Aspheric) | $d_9 = 0.12$ | | |
| $r_{10} = 7.439$ | $d_{10} = 1.90$ | $n_{d5} = 1.72916$ | $\nu_{d5} = 52.85$ |
| $r_{11} = -52.207$ | $d_{11} = 0.70$ | $n_{d6} = 1.84666$ | $\nu_{d6} = 23.78$ |
| $r_{12} = 3.776$ | $d_{12} = $ (Variable) | | |
| $r_{13} = 22.676$ | $d_{13} = 2.47$ | $n_{d7} = 1.70154$ | $\nu_{d7} = 41.24$ |
| $r_{14} = -19.902$ | $d_{14} = $ (Variable) | | |
| $r_{15} = \infty$ | $d_{15} = 0.81$ | $n_{d8} = 1.54771$ | $\nu_{d8} = 62.84$ |
| $r_{16} = \infty$ | $d_{16} = 0.57$ | | |
| $r_{17} = \infty$ | $d_{17} = 0.47$ | $n_{d9} = 1.51633$ | $\nu_{d9} = 64.14$ |
| $r_{18} = \infty$ | $d_{18} = 0.64$ | | |
| $r_{19} = \infty$ (Imaging plane) | | | |

Aspherical Coefficients

1st surface

K = 0.000
$A_4 = -3.62733 \times 10^{-5}$
$A_6 = 4.81423 \times 10^{-7}$
$A_8 = 4.22972 \times 10^{-9}$
$A_{10} = 1.82176 \times 10^{-11}$ 2nd surface K = 0.000
$A_4 = -2.41504 \times 10^{-5}$
$A_6 = 1.48012 \times 10^{-6}$
$A_8 = -2.21250 \times 10^{-8}$
$A_{10} = 2.85635 \times 10^{-10}$ 3rd surface K = 0.000
$A_4 = 1.71598 \times 10^{-4}$
$A_6 = -1.51301 \times 10^{-6}$
$A_8 = 5.08264 \times 10^{-9}$
$A_{10} = 5.24438 \times 10^{-10}$ -continued 4th surface K = 0.000
$A_4 = -3.61635 \times 10^{-4}$
$A_6 = 6.81719 \times 10^{-6}$
$A_8 = -6.47927 \times 10^{-7}$
$A_{10} = 1.06089 \times 10^{-8}$ 8th surface K = 0.000
$A_4 = -1.27685 \times 10^{-4}$
$A_6 = -6.00544 \times 10^{-5}$
$A_8 = 1.38870 \times 10^{-5}$
$A_{10} = -1.21712 \times 10^{-6}$ 9th surface K = 0.000
$A_4 = 5.38902 \times 10^{-4}$
$A_6 = -5.75614 \times 10^{-5}$
$A_8 = 1.06642 \times 10^{-5}$
$A_{10} = -7.48693 \times 10^{-7}$ Zooming Data (∞)

|  | WE | ST | TE |
|---|---|---|---|
| f (mm) | 6.60 | 14.15 | 31.00 |
| $F_{NO}$ | 3.90 | 4.45 | 6.22 |
| 2ω (°) | 62.95 | 29.51 | 14.05 |
| $d_2$ | 1.00 | 6.25 | 12.44 |
| $d_6$ | 15.22 | 7.53 | 1.09 |
| $d_{12}$ | 2.66 | 8.02 | 13.67 |
| $d_{14}$ | 4.91 | 5.85 | 7.07 |

Example 4

| $r_1 = 22.742$ (Aspheric) | $d_1 = 3.35$ | $n_{d1} = 1.49700$ | $\nu_{d1} = 81.54$ |
|---|---|---|---|
| $r_2 = -47.300$ (Aspheric) | $d_2 = $ (Variable) | | |
| $r_3 = -21.350$ (Aspheric) | $d_3 = 0.78$ | $n_{d2} = 1.80610$ | $\nu_{d2} = 40.92$ |
| $r_4 = 6.062$ (Aspheric) | $d_4 = 1.48$ | | |
| $r_5 = 8.570$ | $d_5 = 1.72$ | $n_{d3} = 1.92286$ | $\nu_{d3} = 18.90$ |
| $r_6 = 14.739$ | $d_6 = $ (Variable) | | |
| $r_7 = \infty$ (Stop) | $d_7 = -0.21$ | | |
| $r_8 = 6.141$ (Aspheric) | $d_8 = 1.43$ | $n_{d4} = 1.69350$ | $\nu_{d4} = 53.21$ |
| $r_9 = -22.532$ | $d_9 = 0.62$ | | |
| $r_{10} = 8.223$ | $d_{10} = 1.77$ | $n_{d5} = 1.64943$ | $\nu_{d5} = 52.85$ |
| $r_{11} = 27.848$ | $d_{11} = 0.01$ | $n_{d6} = 1.56384$ | $\nu_{d6} = 60.67$ |
| $r_{12} = 27.848$ | $d_{12} = 0.50$ | $n_{d7} = 1.93936$ | $\nu_{d7} = 23.89$ |
| $r_{13} = 4.049$ | $d_{13} = $ (Variable) | | |
| $r_{14} = 15.568$ | $d_{14} = 2.11$ | $n_{d8} = 1.71575$ | $\nu_{d8} = 41.26$ |
| $r_{15} = -46.256$ | $d_{15} = $ (Variable) | | |
| $r_{16} = \infty$ | $d_{16} = 0.81$ | $n_{d9} = 1.54771$ | $\nu_{d9} = 62.84$ |
| $r_{17} = \infty$ | $d_{17} = 0.57$ | | |
| $r_{18} = \infty$ | $d_{18} = 0.47$ | $n_{d10} = 1.51633$ | $\nu_{d10} = 64.14$ |
| $r_{19} = \infty$ | $d_{19} = 0.60$ | | |
| $r_{20} = \infty$ (Imaging plane) | | | |

Aspherical Coefficients

1st surface

K = 0.897
$A_4 = -1.34975 \times 10^{-5}$
$A_6 = 6.72501 \times 10^{-7}$
$A_8 = -5.17799 \times 10^{-9}$
$A_{10} = 1.54082 \times 10^{-10}$ 2nd surface K = -5.646
$A_4 = 1.91043 \times 10^{-6}$
$A_6 = 1.45719 \times 10^{-6}$ -continued $A_8 = -2.03335 \times 10^{-8}$
$A_{10} = 2.99184 \times 10^{-10}$ 3rd surface $K = -2.963$
$A_4 = 4.02597 \times 10^{-4}$
$A_6 = -6.27977 \times 10^{-6}$
$A_8 = -4.44357 \times 10^{-9}$
$A_{10} = 7.81851 \times 10^{-10}$ 4th surface $K = -0.617$
$A_4 = 4.29831 \times 10^{-4}$
$A_6 = 1.14997 \times 10^{-5}$
$A_8 = -1.28838 \times 10^{-7}$
$A_{10} = -1.00872 \times 10^{-8}$ 8th surface $K = -0.396$
$A_4 = -5.00977 \times 10^{-4}$
$A_6 = 9.08503 \times 10^{-6}$
$A_8 = -1.75461 \times 10^{-6}$
$A_{10} = 9.60499 \times 10^{-8}$ Zooming Data (∞)

|  | WE | ST | TE |
|---|---|---|---|
| f (mm) | 6.62 | 14.24 | 31.84 |
| $F_{NO}$ | 3.94 | 5.07 | 6.00 |
| 2ω (°) | 62.99 | 29.59 | 13.71 |
| $d_2$ | 0.66 | 5.57 | 11.58 |
| $d_6$ | 15.44 | 8.02 | 1.75 |
| $d_{13}$ | 4.14 | 8.61 | 13.26 |
| $d_{15}$ | 4.04 | 5.47 | 7.95 |

Example 5

| | | | |
|---|---|---|---|
| $r_1 = 29.890$ (Aspheric) | $d_1 = 3.07$ | $n_{d1} = 1.49700$ | $v_{d1} = 81.54$ |
| $r_2 = -32.954$ (Aspheric) | $d_2 =$ (Variable) | | |
| $r_3 = -12.063$ (Aspheric) | $d_3 = 0.68$ | $n_{d2} = 1.80610$ | $v_{d2} = 40.92$ |
| $r_4 = 7.786$ (Aspheric) | $d_4 = 1.27$ | | |
| $r_5 = 11.814$ | $d_5 = 1.84$ | $n_{d3} = 1.92286$ | $v_{d3} = 18.90$ |
| $r_6 = 31.303$ | $d_6 =$ (Variable) | | |
| $r_7 = \infty$ (Stop) | $d_7 = -0.20$ | | |
| $r_8 = 6.546$ (Aspheric) | $d_8 = 1.32$ | $n_{d4} = 1.69350$ | $v_{d4} = 53.21$ |
| $r_9 = -46.365$ | $d_9 = 0.66$ | | |
| $r_{10} = 5.092$ | $d_{10} = 1.95$ | $n_{d5} = 1.51965$ | $v_{d5} = 52.81$ |
| $r_{11} = 25.457$ | $d_{11} = 0.01$ | $n_{d6} = 1.56384$ | $v_{d6} = 60.67$ |
| $r_{12} = 25.457$ | $d_{12} = 0.50$ | $n_{d7} = 1.84666$ | $v_{d7} = 23.78$ |
| $r_{13} = 3.437$ | $d_{13} =$ (Variable) | | |
| $r_{14} = 12.463$ | $d_{14} = 2.47$ | $n_{d8} = 1.64663$ | $v_{d8} = 41.07$ |
| $r_{15} = -63.925$ | $d_{15} =$ (Variable) | | |
| $r_{16} = \infty$ | $d_{16} = 0.81$ | $n_{d9} = 1.54771$ | $v_{d9} = 62.84$ |
| $r_{17} = \infty$ | $d_{17} = 0.57$ | | |
| $r_{18} = \infty$ | $d_{18} = 0.47$ | $n_{d10} = 1.51633$ | $v_{d10} = 64.14$ |
| $r_{19} = \infty$ | $d_{19} = 0.59$ | | |
| $r_{20} = \infty$ (Imaging plane) | | | |

Aspherical Coefficients

1st surface $K = 6.836$
$A_4 = 8.15281 \times 10^{-6}$
$A_6 = -1.47223 \times 10^{-6}$
$A_8 = 2.05529 \times 10^{-8}$
$A_{10} = 1.31207 \times 10^{-10}$ 2nd surface $K = -22.648$
$A_4 = -3.68065 \times 10^{-6}$
$A_6 = -1.28031 \times 10^{-6}$
$A_8 = 3.96618 \times 10^{-8}$
$A_{10} = 0$ 3rd surface $K = -9.348$
$A_4 = 4.19891 \times 10^{-4}$
$A_6 = -1.19422 \times 10^{-5}$
$A_8 = 1.64306 \times 10^{-8}$
$A_{10} = 1.95331 \times 10^{-9}$ 4th surface $K = -0.172$
$A_4 = 5.74177 \times 10^{-4}$
$A_6 = 7.70995 \times 10^{-6}$
$A_8 = -1.11839 \times 10^{-6}$
$A_{10} = 1.27634 \times 10^{-8}$ 8th surface $K = -0.195$
$A_4 = -4.52234 \times 10^{-4}$
$A_6 = 7.32480 \times 10^{-5}$
$A_8 = -1.55941 \times 10^{-5}$
$A_{10} = 1.19063 \times 10^{-6}$ Zooming Data (∞)

|  | WE | ST | TE |
|---|---|---|---|
| f (mm) | 6.62 | 14.31 | 31.88 |
| $F_{NO}$ | 4.10 | 5.26 | 6.29 |
| 2ω (°) | 63.09 | 29.40 | 14.00 |
| $d_2$ | 1.04 | 6.24 | 12.00 |
| $d_6$ | 15.80 | 8.01 | 1.36 |
| $d_{13}$ | 3.92 | 7.88 | 12.77 |
| $d_{15}$ | 3.74 | 5.46 | 8.79 |

Example 6

| | | | |
|---|---|---|---|
| $r_1 = 22.609$ (Aspheric) | $d_1 = 3.26$ | $n_{d1} = 1.49700$ | $v_{d1} = 81.54$ |
| $r_2 = -48.382$ (Aspheric) | $d_2 =$ (Variable) | | |
| $r_3 = -20.525$ (Aspheric) | $d_3 = 0.75$ | $n_{d2} = 1.80610$ | $v_{d2} = 40.92$ |
| $r_4 = 6.299$ (Aspheric) | $d_4 = 1.53$ | | |
| $r_5 = 8.878$ | $d_5 = 1.70$ | $n_{d3} = 1.92286$ | $v_{d3} = 18.90$ |
| $r_6 = 15.030$ | $d_6 =$ (Variable) | | |
| $r_7 = \infty$ (Stop) | $d_7 = -0.20$ | | |
| $r_8 = 6.910$ (Aspheric) | $d_8 = 1.30$ | $n_{d4} = 1.74320$ | $v_{d4} = 49.34$ |
| $r_9 = -48.330$ | $d_9 = 0.62$ | | |
| $r_{10} = 6.353$ | $d_{10} = 1.98$ | $n_{d5} = 1.51742$ | $v_{d5} = 52.43$ |
| $r_{11} = 10.770$ | $d_{11} = 0.01$ | $n_{d6} = 1.56384$ | $v_{d6} = 60.67$ |
| $r_{12} = 10.770$ | $d_{12} = 0.50$ | $n_{d7} = 1.92286$ | $v_{d7} = 18.90$ |
| $r_{13} = 3.870$ | $d_{13} =$ (Variable) | | |
| $r_{14} = 13.758$ | $d_{14} = 2.10$ | $n_{d8} = 1.72040$ | $v_{d8} = 35.95$ |
| $r_{15} = -90.822$ | $d_{15} =$ (Variable) | | |
| $r_{16} = \infty$ | $d_{16} = 0.81$ | $n_{d9} = 1.54771$ | $v_{d9} = 62.84$ |
| $r_{17} = \infty$ | $d_{17} = 0.57$ | | |
| $r_{18} = \infty$ | $d_{18} = 0.47$ | $n_{d10} = 1.51633$ | $v_{d10} = 64.14$ |
| $r_{19} = \infty$ | $d_{19} = 0.63$ | | |
| $r_{20} = \infty$ (Imaging plane) | | | |

Aspherical Coefficients

1st surface $K = 6.460$
$A_4 = -7.11455 \times 10^{-5}$
$A_6 = 9.92243 \times 10^{-7}$ -continued $A_8 = -2.57596 \times 10^{-8}$
$A_{10} = 2.75332 \times 10^{-10}$ 2nd surface $K = -75.251$
$A_4 = -6.96671 \times 10^{-5}$
$A_6 = 3.92426 \times 10^{-6}$
$A_8 = -7.28205 \times 10^{-8}$
$A_{10} = 1.01130 \times 10^{-9}$ 3rd surface $K = 1.780$
$A_4 = 4.48246 \times 10^{-4}$
$A_6 = -5.92149 \times 10^{-6}$
$A_8 = -8.87324 \times 10^{-9}$
$A_{10} = 7.59263 \times 10^{-10}$ 4th surface $K = -0.710$
$A_4 = 4.31579 \times 10^{-4}$
$A_6 = 1.04177 \times 10^{-5}$
$A_8 = -1.68802 \times 10^{-7}$
$A_{10} = -8.56841 \times 10^{-9}$ 8th surface $K = -0.629$
$A_4 = -2.25414 \times 10^{-4}$
$A_6 = 5.08977 \times 10^{-5}$
$A_8 = -1.23925 \times 10^{-5}$
$A_{10} = 1.04393 \times 10^{-6}$ Zooming Data (∞)

|  | WE | ST | TE |
|---|---|---|---|
| f (mm) | 6.62 | 14.37 | 31.89 |
| $F_{NO}$ | 3.92 | 5.05 | 6.00 |
| 2ω (°) | 63.15 | 29.34 | 13.81 |
| $d_2$ | 0.73 | 5.82 | 11.62 |
| $d_6$ | 15.64 | 8.03 | 1.77 |
| $d_{13}$ | 3.95 | 8.30 | 13.29 |
| $d_{15}$ | 4.19 | 5.74 | 8.29 |

Example 7

| $r_1 = 25.228$ (Aspheric) | $d_1 = 3.13$ | $n_{d1} = 1.49700$ | $v_{d1} = 81.54$ |
|---|---|---|---|
| $r_2 = -39.416$ (Aspheric) | $d_2$ = (Variable) | | |
| $r_3 = -17.053$ (Aspheric) | $d_3 = 0.79$ | $n_{d2} = 1.80610$ | $v_{d2} = 40.92$ |
| $r_4 = 6.915$ (Aspheric) | $d_4 = 1.62$ | | |
| $r_5 = 8.938$ | $d_5 = 1.62$ | $n_{d3} = 1.92286$ | $v_{d3} = 18.90$ |
| $r_6 = 14.637$ | $d_6$ = (Variable) | | |
| $r_7 = \infty$ (Stop) | $d_7 = -0.20$ | | |
| $r_8 = 5.928$ (Aspheric) | $d_8 = 1.42$ | $n_{d4} = 1.74320$ | $v_{d4} = 49.34$ |
| $r_9 = -32.457$ (Aspheric) | $d_9 = 0.46$ | | |
| $r_{10} = 8.740$ | $d_{10} = 1.89$ | $n_{d5} = 1.56883$ | $v_{d5} = 56.36$ |
| $r_{11} = -26.440$ | $d_{11} = 0.01$ | $n_{d6} = 1.56384$ | $v_{d6} = 60.67$ |
| $r_{12} = -26.440$ | $d_{12} = 0.56$ | $n_{d7} = 1.80518$ | $v_{d7} = 25.42$ |
| $r_{13} = 3.865$ | $d_{13}$ = (Variable) | | |
| $r_{14} = 14.479$ | $d_{14} = 2.31$ | $n_{d8} = 1.65412$ | $v_{d8} = 39.68$ |
| $r_{15} = -39.388$ | $d_{15}$ = (Variable) | | |
| $r_{16} = \infty$ | $d_{16} = 0.81$ | $n_{d9} = 1.54771$ | $v_{d9} = 62.84$ |
| $r_{17} = \infty$ | $d_{17} = 0.57$ | | |
| $r_{18} = \infty$ | $d_{18} = 0.47$ | $n_{d10} = 1.51633$ | $v_{d10} = 64.14$ |
| $r_{19} = \infty$ | $d_{19} = 0.60$ | | |
| $r_{20} = \infty$ (Imaging plane) | | | |

Aspherical Coefficients

1st surface $K = -0.694$
$A_4 = 6.14212 \times 10^{-6}$ $A_6 = 2.65100 \times 10^{-7}$
$A_8 = 9.42196 \times 10^{-9}$
$A_{10} = -3.84274 \times 10^{-12}$ 2nd surface $K = -24.719$
$A_4 = -3.26002 \times 10^{-5}$
$A_6 = 1.23035 \times 10^{-6}$
$A_8 = -1.54692 \times 10^{-9}$
$A_{10} = 1.34047 \times 10^{-11}$ 3rd surface $K = -24.002$
$A_4 = 2.28397 \times 10^{-4}$
$A_6 = -4.71199 \times 10^{-6}$
$A_8 = 1.06101 \times 10^{-8}$
$A_{10} = 4.53768 \times 10^{-10}$ 4th surface $K = -0.448$
$A_4 = 6.98069 \times 10^{-4}$
$A_6 = 2.90492 \times 10^{-6}$
$A_8 = -2.70840 \times 10^{-8}$
$A_{10} = -7.27663 \times 10^{-9}$ 8th surface $K = -0.263$
$A_4 = -1.68267 \times 10^{-4}$
$A_6 = 4.60773 \times 10^{-5}$
$A_8 = -1.56338 \times 10^{-6}$
$A_{10} = 4.67614 \times 10^{-7}$ 9th surface $K = 29.398$
$A_4 = 5.45975 \times 10^{-4}$
$A_6 = 3.91554 \times 10^{-5}$
$A_8 = 5.61313 \times 10^{-7}$
$A_{10} = 3.74597 \times 10^{-7}$ Zooming Data (∞)

|  | WE | ST | TE |
|---|---|---|---|
| f (mm) | 6.62 | 14.44 | 32.03 |
| $F_{NO}$ | 3.92 | 5.09 | 6.00 |
| 2ω (°) | 62.87 | 29.22 | 13.72 |
| $d_2$ | 0.71 | 5.73 | 11.73 |
| $d_6$ | 15.87 | 8.10 | 1.77 |
| $d_{13}$ | 3.88 | 8.34 | 13.07 |
| $d_{15}$ | 4.09 | 5.74 | 8.38 |

Example 8

| $r_1 = 27.070$ (Aspheric) | $d_1 = 2.85$ | $n_{d1} = 1.49700$ | $v_{d1} = 81.54$ |
|---|---|---|---|
| $r_2 = -31.995$ (Aspheric) | $d_2$ = (Variable) | | |
| $r_3 = -15.391$ (Aspheric) | $d_3 = 0.79$ | $n_{d2} = 1.80610$ | $v_{d2} = 40.92$ |
| $r_4 = 6.717$ (Aspheric) | $d_4 = 1.51$ | | |
| $r_5 = 13.743$ | $d_5 = 1.68$ | $n_{d3} = 1.92286$ | $v_{d3} = 18.90$ |
| $r_6 = 45.153$ | $d_6$ = (Variable) | | |
| $r_7 = \infty$ (Stop) | $d_7 = -0.20$ | | |
| $r_8 = 5.286$ (Aspheric) | $d_8 = 1.54$ | $n_{d4} = 1.74320$ | $v_{d4} = 49.34$ |
| $r_9 = -41.141$ | $d_9 = 0.10$ | | |
| $r_{10} = 8.319$ | $d_{10} = 1.27$ | $n_{d5} = 1.57099$ | $v_{d5} = 50.80$ |
| $r_{11} = 86.109$ | $d_{11} = 0.01$ | $n_{d6} = 1.56384$ | $v_{d6} = 60.67$ |
| $r_{12} = 86.109$ | $d_{12} = 1.10$ | $n_{d7} = 1.80518$ | $v_{d7} = 25.42$ |
| $r_{13} = 3.328$ | $d_{13}$ = (Variable) | | |
| $r_{14} = 17.711$ (Aspheric) | $d_{14} = 2.64$ | $n_{d8} = 1.52542$ | $v_{d8} = 55.78$ |
| $r_{15} = -18.916$ | $d_{15}$ = (Variable) | | |
| $r_{16} = \infty$ | $d_{16} = 0.81$ | $n_{d9} = 1.54771$ | $v_{d9} = 62.84$ |
| $r_{17} = \infty$ | $d_{17} = 0.57$ | | |

-continued

| | | | |
|---|---|---|---|
| $r_{18} = \infty$ | $d_{18} = 0.47$ | $n_{d10} = 1.51633$ | $\nu_{d10} = 64.14$ |
| $r_{19} = \infty$ | $d_{19} = 0.62$ | | |
| $r_{20} = \infty$ (Imaging plane) | | | |

Aspherical Coefficients

1st surface

K = −0.954
$A_4 = -3.21640 \times 10^{-5}$
$A_6 = -1.17107 \times 10^{-6}$
$A_8 = 3.37096 \times 10^{-8}$
$A_{10} = -3.95839 \times 10^{-10}$ 2nd surface K = 1.852
$A_4 = 2.70853 \times 10^{-6}$
$A_6 = -3.24208 \times 10^{-7}$
$A_8 = 2.39365 \times 10^{-9}$
$A_{10} = 0$ 3rd surface K = −1.337
$A_4 = 1.53272 \times 10^{-4}$
$A_6 = 3.75051 \times 10^{-6}$
$A_8 = -2.58664 \times 10^{-7}$
$A_{10} = 4.18276 \times 10^{-9}$ 4th surface K = −1.391
$A_4 = -2.69176 \times 10^{-5}$
$A_6 = 3.03620 \times 10^{-5}$
$A_8 = -1.45128 \times 10^{-6}$
$A_{10} = 2.37199 \times 10^{-8}$ 8th surface K = −0.615
$A_4 = -2.41219 \times 10^{-4}$
$A_6 = -1.54777 \times 10^{-5}$
$A_8 = 4.02754 \times 10^{-6}$
$A_{10} = -2.74462 \times 10^{-7}$ 14th surface K = 1.437
$A_4 = 1.74789 \times 10^{-5}$
$A_6 = 4.96700 \times 10^{-6}$
$A_8 = -3.76911 \times 10^{-7}$
$A_{10} = 7.93541 \times 10^{-9}$ Zooming Data (∞)

| | WE | ST | TE |
|---|---|---|---|
| f (mm) | 6.62 | 14.38 | 31.92 |
| $F_{NO}$ | 3.82 | 5.23 | 6.17 |
| 2ω (°) | 63.15 | 30.00 | 14.25 |
| $d_2$ | 1.08 | 4.60 | 10.35 |
| $d_6$ | 16.18 | 8.04 | 1.25 |
| $d_{13}$ | 3.37 | 9.15 | 13.36 |
| $d_{15}$ | 4.47 | 6.07 | 10.30 |

Example 9

| | | | |
|---|---|---|---|
| $r_1 = 25.170$ (Aspheric) | $d_1 = 2.87$ | $n_{d1} = 1.45600$ | $\nu_{d1} = 90.28$ |
| $r_2 = -34.619$ (Aspheric) | $d_2$ = (Variable) | | |
| $r_3 = -17.761$ (Aspheric) | $d_3 = 0.80$ | $n_{d2} = 1.80610$ | $\nu_{d2} = 40.92$ |
| $r_4 = 6.479$ (Aspheric) | $d_4 = 1.40$ | | |
| $r_5 = 11.066$ | $d_5 = 1.64$ | $n_{d3} = 1.92286$ | $\nu_{d3} = 20.88$ |
| $r_6 = 30.143$ | $d_6$ = (Variable) | | |
| $r_7 = \infty$ (Stop) | $d_7 = 0.20$ | | |
| $r_8 = 5.960$ (Aspheric) | $d_8 = 1.81$ | $n_{d4} = 1.64171$ | $\nu_{d4} = 39.83$ |
| $r_9 = -34.259$ (Aspheric) | $d_9 = 0.12$ | | |
| $r_{10} = 7.643$ | $d_{10} = 1.90$ | $n_{d5} = 1.72916$ | $\nu_{d5} = 52.85$ |

-continued

| | | | |
|---|---|---|---|
| $r_{11} = -43.828$ | $d_{11} = 0.70$ | $n_{d6} = 1.84666$ | $\nu_{d6} = 23.78$ |
| $r_{12} = 3.808$ | $d_{12}$ = (Variable) | | |
| $r_{13} = 24.046$ | $d_{13} = 2.50$ | $n_{d7} = 1.70154$ | $\nu_{d7} = 41.24$ |
| $r_{14} = -19.323$ | $d_{14}$ = (Variable) | | |
| $r_{15} = \infty$ | $d_{15} = 0.81$ | $n_{d8} = 1.54771$ | $\nu_{d8} = 62.84$ |
| $r_{16} = \infty$ | $d_{16} = 0.57$ | | |
| $r_{17} = \infty$ | $d_{17} = 0.47$ | $n_{d9} = 1.51633$ | $\nu_{d9} = 64.14$ |
| $r_{18} = \infty$ | $d_{18} = 0.64$ | | |
| $r_{19} = \infty$ (Imaging plane) | | | |

Aspherical Coefficients

1st surface

K = 0.000
$A_4 = -3.98592 \times 10^{-5}$
$A_6 = 1.10983 \times 10^{-6}$
$A_8 = -1.38799 \times 10^{-8}$
$A_{10} = 2.05789 \times 10^{-10}$ 2nd surface K = 0.000
$A_4 = -2.26413 \times 10^{-5}$
$A_6 = 2.33915 \times 10^{-6}$
$A_8 = -5.12737 \times 10^{-8}$
$A_{10} = 6.21743 \times 10^{-10}$ 3rd surface K = 0.000
$A_4 = 2.30269 \times 10^{-4}$
$A_6 = -1.47119 \times 10^{-6}$
$A_8 = -3.88247 \times 10^{-8}$
$A_{10} = 1.20634 \times 10^{-9}$ 4th surface K = 0.000
$A_4 = -3.23017 \times 10^{-4}$
$A_6 = 9.43027 \times 10^{-6}$
$A_8 = -8.09017 \times 10^{-7}$
$A_{10} = 1.22215 \times 10^{-8}$ 8th surface K = 0.000
$A_4 = -1.70490 \times 10^{-4}$
$A_6 = -5.22036 \times 10^{-5}$
$A_8 = 1.35092 \times 10^{-5}$
$A_{10} = -1.17412 \times 10^{-6}$ 9th surface K = 0.000
$A_4 = 5.22759 \times 10^{-4}$
$A_6 = -5.11852 \times 10^{-5}$
$A_8 = 1.21991 \times 10^{-5}$
$A_{10} = -9.50685 \times 10^{-7}$ Zooming Data (∞)

| | WE | ST | TE |
|---|---|---|---|
| f (mm) | 6.60 | 14.15 | 31.00 |
| $F_{NO}$ | 3.91 | 4.49 | 6.28 |
| 2ω (°) | 62.98 | 29.50 | 14.01 |
| $d_2$ | 1.00 | 6.17 | 12.38 |
| $d_6$ | 15.04 | 7.53 | 1.08 |
| $d_{12}$ | 2.67 | 8.20 | 13.56 |
| $d_{14}$ | 4.86 | 5.70 | 7.07 |

Example 10

| | | | |
|---|---|---|---|
| $r_1 = 24.642$ (Aspheric) | $d_1 = 2.90$ | $n_{d1} = 1.43875$ | $\nu_{d1} = 94.93$ |
| $r_2 = -33.135$ (Aspheric) | $d_2$ = (Variable) | | |

-continued

| | | | |
|---|---|---|---|
| $r_3 = -17.550$ (Aspheric) | $d_3 = 0.80$ | $n_{d2} = 1.80610$ | $v_{d2} = 40.92$ |
| $r_4 = 6.509$ (Aspheric) | $d_4 = 1.40$ | | |
| $r_5 = 11.036$ | $d_5 = 1.65$ | $n_{d3} = 1.92286$ | $v_{d3} = 20.88$ |
| $r_6 = 30.137$ | $d_6 =$ (Variable) | | |
| $r_7 = \infty$ (Stop) | $d_7 = 0.19$ | | |
| $r_8 = 5.939$ (Aspheric) | $d_8 = 1.82$ | $n_{d4} = 1.64005$ | $v_{d4} = 39.80$ |
| $r_9 = -30.831$ (Aspheric) | $d_9 = 0.12$ | | |
| $r_{10} = 7.767$ | $d_{10} = 1.90$ | $n_{d5} = 1.72916$ | $v_{d5} = 52.85$ |
| $r_{11} = -39.677$ | $d_{11} = 0.70$ | $n_{d6} = 1.84666$ | $v_{d6} = 23.78$ |
| $r_{12} = 3.807$ | $d_{12} =$ (Variable) | | |
| $r_{13} = 24.465$ | $d_{13} = 2.50$ | $n_{d7} = 1.70154$ | $v_{d7} = 41.24$ |
| $r_{14} = -19.399$ | $d_{14} =$ (Variable) | | |
| $r_{15} = \infty$ | $d_{15} = 0.81$ | $n_{d8} = 1.54771$ | $v_{d8} = 62.84$ |
| $r_{16} = \infty$ | $d_{16} = 0.57$ | | |
| $r_{17} = \infty$ | $d_{17} = 0.47$ | $n_{d9} = 1.51633$ | $v_{d9} = 64.14$ |
| $r_{18} = \infty$ | $d_{18} = 0.64$ | | |
| $r_{19} = \infty$ (Imaging plane) | | | |

Aspherical Coefficients

1st surface $K = 0.000$
$A_4 = -3.75938 \times 10^{-5}$
$A_6 = 1.20753 \times 10^{-6}$
$A_8 = -1.46223 \times 10^{-8}$
$A_{10} = 2.14106 \times 10^{-10}$ 2nd surface $K = 0.000$
$A_4 = -1.88727 \times 10^{-5}$
$A_6 = 2.57005 \times 10^{-6}$
$A_8 = -5.84582 \times 10^{-8}$
$A_{10} = 7.23429 \times 10^{-10}$ 3rd surface $K = 0.000$
$A_4 = 2.51042 \times 10^{-4}$
$A_6 = -2.30552 \times 10^{-6}$
$A_8 = -1.30718 \times 10^{-8}$
$A_{10} = 9.50618 \times 10^{-10}$ 4th surface $K = 0.000$
$A_4 = -2.87328 \times 10^{-4}$
$A_6 = 7.95321 \times 10^{-6}$
$A_8 = -7.04413 \times 10^{-7}$
$A_{10} = 1.02918 \times 10^{-8}$ 8th surface $K = 0.000$
$A_4 = -2.85331 \times 10^{-4}$
$A_6 = -1.78138 \times 10^{-5}$
$A_8 = 5.74287 \times 10^{-6}$
$A_{10} = -6.48494 \times 10^{-7}$ 9th surface $K = 0.000$
$A_4 = 4.01044 \times 10^{-4}$
$A_6 = -6.65678 \times 10^{-7}$
$A_8 = 1.94321 \times 10^{-8}$
$A_{10} = -4.40726 \times 10^{-8}$ Zooming Data (∞)

| | WE | ST | TE |
|---|---|---|---|
| f (mm) | 6.60 | 14.15 | 31.00 |
| $F_{NO}$ | 3.91 | 4.51 | 6.32 |
| 2ω (°) | 62.98 | 29.49 | 13.98 |
| $d_2$ | 1.00 | 6.14 | 12.38 |
| $d_6$ | 15.03 | 7.51 | 1.08 |
| $d_{12}$ | 2.67 | 8.20 | 13.53 |
| $d_{14}$ | 4.81 | 5.62 | 7.05 |

FIGS. 11 to 20 are aberration diagrams for Examples 1 to 10 upon focusing on an object point at infinity. In these aberration diagrams, (a), (b) and (c) are indicative of spherical aberrations (SA), astigmatism (AS), distortion (DT) and chromatic aberration of magnification (CC) at the wide-angle end, in the intermediate state, and at the telephoto end, respectively, and "FIY" stands for a half angle of view.

Set out below are the values of conditions (1) to (8) and (A) to (D) in the aforesaid Examples 1 to 10.

| Example | 1 | 2 | 3 | 4 | 5 |
|---|---|---|---|---|---|
| (1) | 4.7 | 4.7 | 4.7 | 4.81 | 4.81 |
| (2) | 81.54 | 81.54 | 81.54 | 81.54 | 81.54 |
| (3) | 1.620 | 1.629 | 1.629 | 1.587 | 1.598 |
| (4) | 1.012 | 1.022 | 1.047 | 0.986 | 1.005 |
| (5) | −0.284 | −0.293 | −0.302 | −0.267 | −0.273 |
| (6) | −0.283 | −0.3 | −0.198 | −0.351 | −0.048 |
| (7) | 0.562 | 0.562 | 0.496 | 0.557 | 0.215 |
| (8) | 2.159 | 2.129 | 2.058 | 2.215 | 2.732 |
| (A) | 0.667 | 0.644 | 0.577 | 0.600 | 0.573 |
| (B) | 0.142 | 0.137 | 0.123 | 0.125 | 0.119 |
| (C) | 0.741 | 0.765 | 0.677 | 0.654 | 0.669 |
| (D) | 0.158 | 0.163 | 0.144 | 0.136 | 0.139 |

| Example | 6 | 7 | 8 | 9 | 10 |
|---|---|---|---|---|---|
| (1) | 4.81 | 4.84 | 4.82 | 4.69 | 4.70 |
| (2) | 81.54 | 81.54 | 81.54 | 90.28 | 94.93 |
| (3) | 1.599 | 1.592 | 1.598 | 1.629 | 1.629 |
| (4) | 0.987 | 0.982 | 0.939 | 1.047 | 1.055 |
| (5) | −0.267 | −0.268 | −0.268 | 0.300 | −0.301 |
| (6) | −0.363 | −0.219 | −0.083 | 0.158 | −0.147 |
| (7) | 0.530 | 0.422 | 0.392 | 0.465 | 0.459 |
| (8) | 2.357 | 2.311 | 2.079 | 1.949 | 1.888 |
| (A) | 0.600 | 0.609 | 0.601 | 0.581 | 0.583 |
| (B) | 0.124 | 0.126 | 0.125 | 0.124 | 0.124 |
| (C) | 0.666 | 0.654 | 0.606 | 0.687 | 0.688 |
| (D) | 0.138 | 0.135 | 0.126 | 0.146 | 0.147 |

In Examples 1 to 10, it is understood that the aperture stop S is in an integral form with the third lens group G3 from cost considerations; however, it would be obvious to those skilled in the art that even though the aperture stop is designed to move independently from other lens groups during zooming, satisfactory optical performance is easily achievable.

In the invention, as can be seen from Examples 1 to 10, the first lens group G1 is made up of a double-convex single lens; the second lens group G2 is made up of two lenses: a double-concave negative lens of relatively strong power and a meniscus-form positive lens convex on its object side; and the third lens group G3 is made up of the aperture stop S and two lens elements of positive power wherein one is a positive single lens and another positive-negative cemented lens that is significant for correction of chromatic aberrations. Two such lens elements are allowed to have a vital function of correcting aberrations.

It is preferable that the aperture stop and a shutter unit are located between the second lens group G2 and the third lens group G3 for integral movement with the third lens group G3 during zooming. It is then possible to position the entrance pupil at a position close to the object side so that the exit pupil can be spaced away from the image plane. At that position, off-axis rays are kept so low that the shutter unit cannot be bulky and the dead space for moving the aperture stop S and shutter unit can be kept more limited.

To cut off unwanted light such as ghosts and flares, it is acceptable to locate a flare stop other than the aperture stop S. That flare stop may then be located somewhere on the object side of the first lens group G1, between the first lens group G1 and the second lens group G2, between the second lens group G2 and the third lens group G3, between the third lens group G3 and the fourth lens group G4, and between the fourth lens group G4 and the image plane I. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multicoating is then desired because of being capable of effectively reducing ghosts and flares. Each lens, a cover glass or the like may just as well be applied with an infrared cut coating.

Desirously, focusing for the adjusting the focus is implemented with the fourth lens group G4. Focusing with the fourth lens group G4 eases off loads on a motor because there is a light lens weight, and works for making the lens barrel compact because there is none of the change in the total length during zooming, and a drive motor is mounted in the lens barrel.

As noted just above, it is desired that focusing for adjusting the focus is implemented with the fourth lens group G4; however, it may be implemented with the second lens group G2 or the third lens group G3, or by the movement of multiple lens groups. Moreover, focusing may be implemented by extending out the whole lens system or reeling out or in some lenses.

The shading of brightness at the peripheral position of an image may be reduced by shifting the microlenses of a CCD. For instance, the CCD microlens design may be modified in conformity with the angle of incidence of light rays at each image height, or decreases in the quantity of light at the peripheral position of the image may be corrected by image processing.

It is also acceptable to intentionally produce distortion at the optical system so as to correct image distortion by implementing electrical processing after taking operation.

The fourth lens group G4 may be made up of a plastic material. The leading role of the fourth lens group G4 is to locate the exit pupil at a proper position thereby efficiently entering light rays in an electronic imaging device such as a CCD or CMOS. With such a role in mind, the fourth lens group G4 may just as well be made up of a vitreous material of low refractive index such as a plastic lens. If the plastic lens is used for the fourth lens group G4, it is then possible to provide much less costly zoom lenses.

Figure 21:
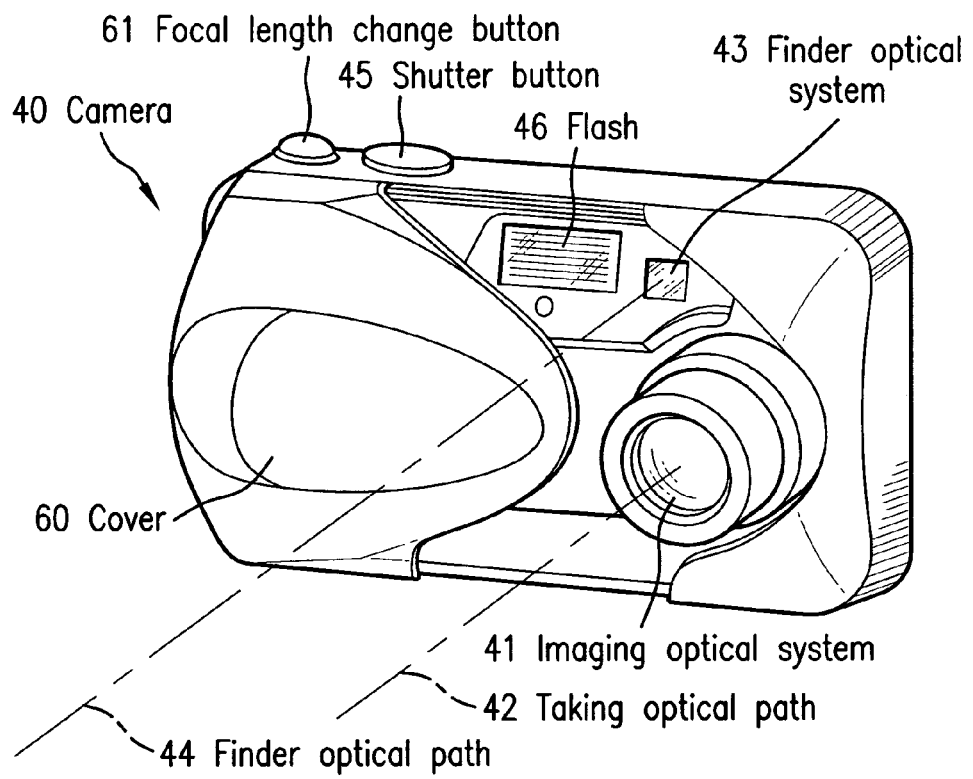
FIG. 21 is a front perspective view of the outside shape of a digital camera according to the invention.
Figure 22:
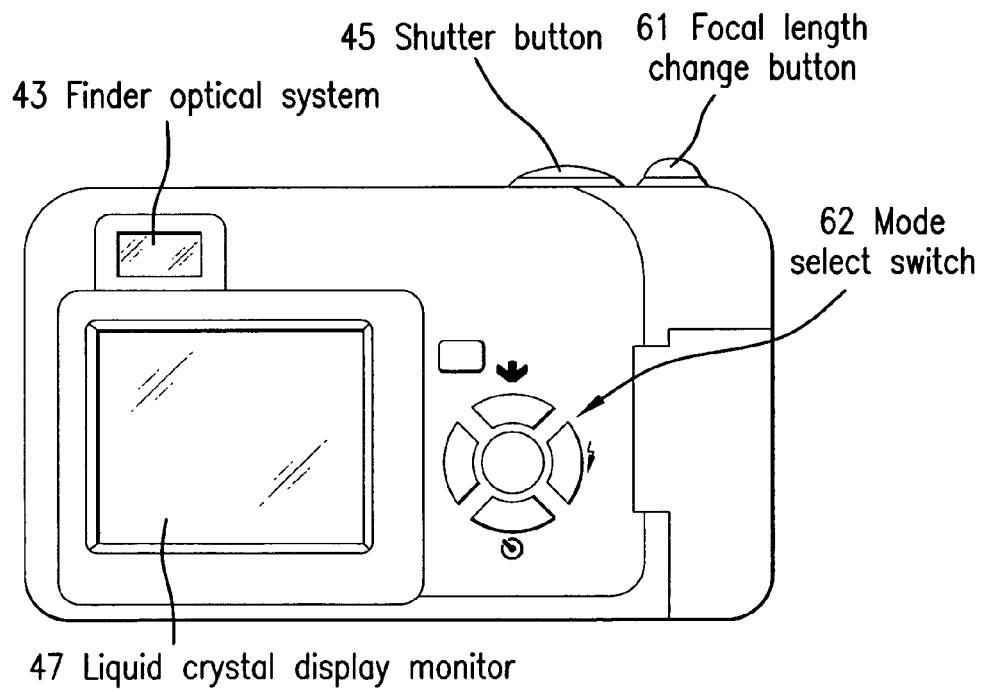
FIG. 22 is a rear perspective view of the digital camera of FIG. 21.
Figure 23:
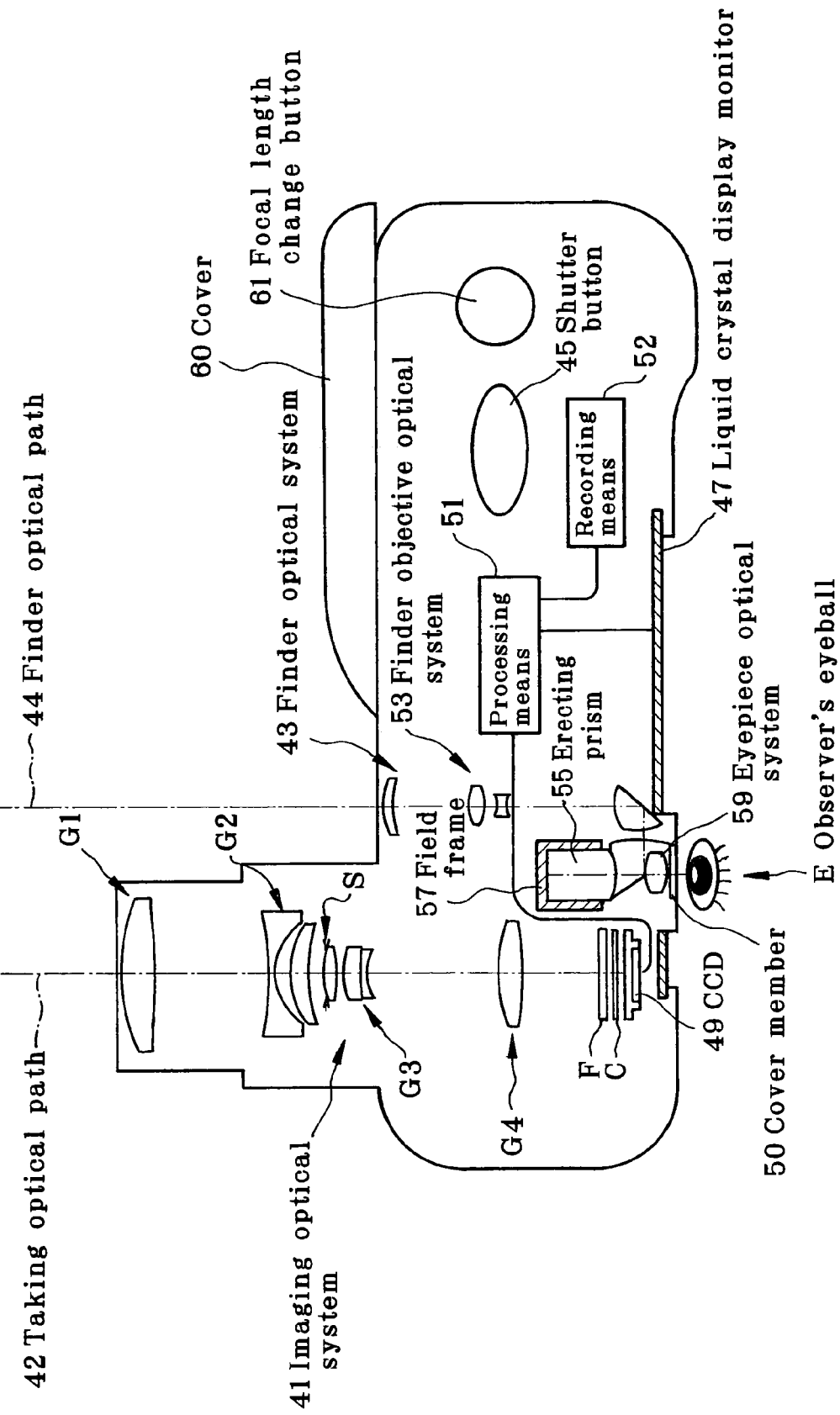
FIG. 23 is a sectional view of the digital camera of FIG. 21.

FIGS. 21, 22 and 23 are conceptual illustrations of a digital camera, in which the zoom lens of the invention is incorporated in a taking optical system 41. FIG. 21 is a front perspective view of the appearance of a digital camera 40; FIG. 22 is a rear perspective view of the same; and FIG. 23 is a schematic sectional view of the setup of the digital camera 40. However, FIGS. 21 and 23 show the taking optical system 41 in operation. In the embodiment here, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is extended out, as in FIG. 23. As the shutter 45 mounted on the upper portion of the camera 40 is pressed down, it causes an image to be taken through the taking optical system 41, for instance, the zoom optical system of Example 4. An object image formed by the taking optical system 41 is formed on the imaging plane (photoelectric plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 21-23) and an erecting prism system 55 composed of erecting prisms 55a, 55b and 55c, and whose focal length varies in association with the zoom optical system that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 24:
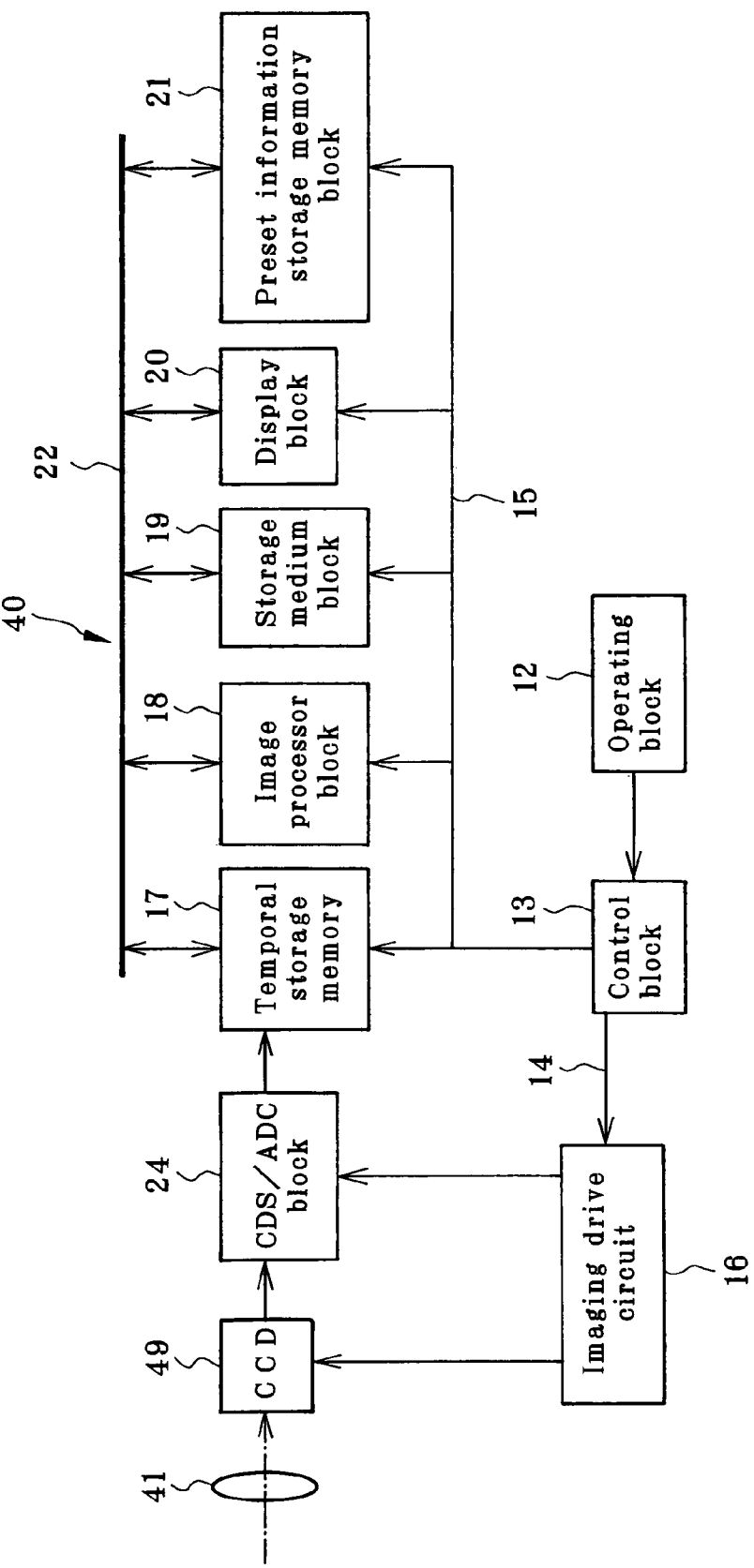
FIG. 24 is a block diagram illustrative of the construction of internal circuits in part of the digital camera of FIG. 21.

FIG. 24 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 24, the digital camera 40 is built up of an operating block 12, a control block 13 connected to the operating block 12 and an imaging drive circuit 16 connected to the control signal output port of the control block 13 via buses 14 and 15 as well as a temporal storage memory block 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 21, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable image-formation capabilities all over the zoom range, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

What we claim is:

1. A zoom lens, characterized by comprising, in order from its object side, a positive first lens group, a negative second lens group, a positive third lens group and a positive fourth lens group, wherein zooming is implemented by changing a space between adjacent lens groups, said first lens group comprises one positive lens, said second lens group comprises two lenses, and said fourth lens group comprises one positive lens, with satisfaction of the following conditions:

$$4<Z<8 \quad (1)$$

$$80<v_d<98 \quad (2)$$

where Z is a zoom ratio, and
$v_d$ is an Abbe constant of a first lens forming the first lens group.

2. The zoom lens according to claim 1, characterized by satisfying the following condition:

$$1.2<DT/f_t<2.0 \quad (3)$$

where DT is a distance as measured along an optical axis from an apex of an object-side surface of a first lens at a telephoto end of the optical system to an imaging position, and
$f_t$ is a focal length of the whole system at the telephoto end.

3. The zoom lens according to claim 1, characterized by satisfying the following condition:

$$0.5<f_1/f_t<1.50 \quad (4)$$

where $f_1$ is a focal length of the first lens group, and
$f_t$ is a focal length of the whole system at a telephoto end.

4. The zoom lens according to claim 1, characterized by satisfying the following condition:

$$0.1<f_2/f_t<-0.40 \quad (5)$$

where $f_2$ is a focal length of the second lens group, and
$f_t$ is a focal length of the whole system at a telephoto end.

5. The zoom lens according to claim 1, characterized by satisfying the following condition:

$$-0.5<SF_1<-0.03 \quad (6)$$

where $SF_1$ is defined as $SF_1=(R_{1f}+R_{1r})/(R_{1f}-R_{1r})$ wherein
$R_{1f}$ is a radius of curvature of an object-side surface of a first lens, and
$R_{1r}$ is a radius of curvature of an image-side surface of the first lens.

6. The zoom lens according to claim 1, characterized by satisfying the following condition:

$$0<SF_2<0.6 \quad (7)$$

where $SF_2$ is defined as $SF_2=(R_{2f}+R_{2r})/(R_{2f}-R_{2r})$ wherein:
$R_{2f}$ is a radius of curvature of an object-side surface of an object-side lens in the second lens group, and
$R_{2r}$ is a radius of curvature of an image-side surface of an object-side lens in the second lens group.

7. The zoom lens according to claim 1, characterized by satisfying the following condition:

$$1.5<R(G_{1r})/R(G_{2f})<2.4 \quad (8)$$

where $R(G_{1r})$ is a radius of curvature of a surface located in, and nearest to the image side of, the first lens group, and
$R(G_{2f})$ is a radius of curvature of a surface located in, and nearest to the object side of, the second lens group.

8. The zoom lens according to claim 7, characterized in that the surface located in, and nearest to the image side of, the first lens group is an aspheric surface.

9. An electronic imaging apparatus, characterized by comprising a zoom lens as recited in claim 1, and an imaging device located on an image side of said zoom lens.

10. A zoom lens, characterized by comprising, in order from its object side, a positive first lens group, a negative second lens group, a positive third lens group and a positive fourth lens group, wherein zooming is implemented by changing a space between adjacent lens groups, said first lens group comprises one positive lens, said second lens group comprises two lenses, and said fourth lens group comprises one positive lens, with satisfaction of the following condition:

$$0.4<D_2/f_w<0.7 \quad (A)$$

where $D_2$ is a distance as measured along an optical axis from an apex of a lens located in, and nearest to the object side of, the second lens group to an apex of a lens located in, and nearest to the image side of, the second lens group, and
$f_w$ is a focal length of the whole system at a wide-angle end.

11. A zoom lens, characterized by comprising, in order from its object side, a positive first lens group, a negative second lens group, a positive third lens group and a positive fourth lens group, wherein zooming is implemented by changing a space between adjacent lens groups, said first lens group comprises one positive lens, said second lens group comprises two lenses, and said fourth lens group comprises one positive lens, with satisfaction of the following condition:

$$0.08 < D_2/f_t < 0.22 \quad \text{(B)}$$

where $D_2$ is a distance as measured along an optical axis from an apex of a lens located in, and nearest to the object side of, the second lens group to an apex of a lens located in, and nearest to the image side of, the second lens group, and $f_w$ is a focal length of the whole system at a telephoto end.

12. A zoom lens, characterized by comprising, in order from its object side, a positive first lens group, a negative second lens group, a positive third lens group and a positive fourth lens group, wherein zooming is implemented by changing a space between adjacent lens groups, said first lens group comprises one positive lens, said second lens group comprises two lenses, and said fourth lens group comprises one positive lens, with satisfaction of the following condition:

$$0.4 < D_3/f_w < 0.7 \quad \text{(C)}$$

where $D_3$ is a distance as measured along an optical axis from an apex of a lens located in, and nearest to the object side of, the third lens group to an apex of a lens located in, and nearest to the image side of, the third lens group, and $f_w$ is a focal length of the whole system at a wide-angle end.

13. A zoom lens, characterized by comprising, in order from its object side, a positive first lens group, a negative second lens group, a positive third lens group and a positive fourth lens group, wherein zooming is implemented by changing a space between adjacent lens groups, said first lens group comprises one positive lens, said second lens group comprises two lenses, and said fourth lens group comprises one positive lens, with satisfaction of the following condition:

$$0.1 < D_3/f_t < 0.22 \quad \text{(D)}$$

where $D_3$ is a distance as measured along an optical axis from an apex of a lens located in, and nearest to the object side of, the third lens group to an apex of a lens located in, and nearest to the image side of, the third lens group, and $f_w$ is a focal length of the whole system at a telephoto end.

* * * * *